United States Patent
Greene et al.

(10) Patent No.: US 11,068,497 B2
(45) Date of Patent: Jul. 20, 2021

(54) MACHINE FOR GENERATING UNSTRUCTURED SYNTAX

(71) Applicant: Accenture Global Solutions Limited, Dublin (IE)

(72) Inventors: Kevin Greene, Miami Beach, FL (US); Noel Ramathal, Chicago, IL (US)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 203 days.

(21) Appl. No.: 16/357,301

(22) Filed: Mar. 18, 2019

(65) Prior Publication Data

US 2019/0213199 A1 Jul. 11, 2019

Related U.S. Application Data

(63) Continuation of application No. 15/223,732, filed on Jul. 29, 2016, now Pat. No. 10,282,454.

(60) Provisional application No. 62/328,451, filed on Apr. 27, 2016, provisional application No. 62/330,737, filed on May 2, 2016.

(51) Int. Cl.
*G06F 16/00* (2019.01)
*G06F 16/25* (2019.01)

(52) U.S. Cl.
CPC ......... *G06F 16/258* (2019.01); *G06F 16/252* (2019.01); *G06F 16/254* (2019.01)

(58) Field of Classification Search
CPC ..... G06F 16/258; G06F 16/252; G06F 16/254
USPC ........................................................ 707/756
See application file for complete search history.

(56) References Cited

U.S. PATENT DOCUMENTS

| | | | |
|---|---|---|---|
| 6,026,371 A | 2/2000 | Beck et al. | |
| 8,024,369 B2 | 9/2011 | Pellegrini et al. | |
| 2004/0117739 A1 | 6/2004 | Challenger et al. | |
| 2005/0246353 A1* | 11/2005 | Ezer | G06F 40/143 |
| 2007/0011134 A1* | 1/2007 | Langseth | G06F 16/254 |
| 2007/0028221 A1* | 2/2007 | Ukelson | G06F 16/258 |
| | | | 717/136 |
| 2009/0138790 A1 | 5/2009 | Larcheveque et al. | |
| 2011/0093467 A1 | 4/2011 | Sharp et al. | |
| 2014/0067363 A1 | 3/2014 | Ogren et al. | |
| 2014/0330799 A1 | 11/2014 | White | |

(Continued)

FOREIGN PATENT DOCUMENTS

| WO | WO 2007/005730 | 1/2007 |
|---|---|---|
| WO | WO 2015/165545 | 11/2015 |

OTHER PUBLICATIONS

Australia Patent Office, First Examination Report from Australian counterpart Patent Application No. 2016228174 dated Sep. 26, 2016, 7 pages.

(Continued)

*Primary Examiner* — Chelcie L Daye
(74) *Attorney, Agent, or Firm* — Brinks Gilson & Lione

(57) ABSTRACT

Data conversion circuitry receives structured records including normalized data and performs a data conversion process on the structured records to generate unstructured records including unstructured syntax. The data conversion circuitry performs the data conversion process according to an unstructured syntax requirement including a syntax field mapping between the structured records and the generated unstructured records.

20 Claims, 26 Drawing Sheets

(56) References Cited

U.S. PATENT DOCUMENTS

2015/0332422 A1  11/2015  Gilmartin

OTHER PUBLICATIONS

Australia Patent Office, Second Examination Report from Australian counterpart Patent Application No. 2016228174 dated Feb. 10, 2017, 6 pages.
Australia Patent Office, Notice of Acceptance from Australian counterpart Patent Application No. 2016228174 dated Mar. 21, 2017, 3 pages.
Stodulka, P., "Anatomy of a SWIFT message", [retrieved from internet on Sep. 7, 2017] <URL: http://coding.pstodulka.com/2015/01/10/anatomy-of-a-swift-message/> published on Jan. 10, 2015.
Wikipedia, "Speech synthesis", [retrieved from internet on Sep. 7, 2017] <URL: https://web.archive.org/web/20160329225717/https://en.wikipedia.org/wiki/Speech_synthesis> published on Mar. 29, 2016 as per Wayback Machine.

* cited by examiner

| Benefit Plan Template | Account Id | Benefit Plan Name Description | Benefit Plan Name | Benefit Plan Category | Site State | Site Creation Date | Effective Date | Action | Plan Year Start Day | Plan Year Start Month | Renewal Date | Header Notes | Funded As | From Month | From Day To Month | To Month | To Month Day | Medicare Enrollment Period |
|---|---|---|---|---|---|---|---|---|---|---|---|---|---|---|---|---|---|---|
| TLC HDHP Plan | AC00000002102 | Main HDHP | Main1 | HDHP | Texas | 1/1/1800 | 1/1/2015 | New | 12 | 1-Jan | 1/1/2016 | | | January | 1 February | | 1 | |
| TLC PPO Plan | AC00000002102 | Main PPO 2 | Main2 | PPO | Texas | 1/1/1800 | 1/1/2015 | New | 12 | 1-Jan | 1/1/2016 | | | | | | | |
| TLC PPO Plan | AC00000002102 | Main PPO 3 | Main3 | PPO | Texas | 1/1/1800 | 1/1/2015 | New | 12 | 1-Jan | 1/1/2016 | | | | | | | |
| TLC Medicare | AC00000002102 | Medicare | Main4 | Medicare | Texas | 1/1/1800 | 1/1/2015 | New | 12 | 1-Jan | 1/1/2016 | | Fully Insured | | | | | |

| Benefit Plan ID | User Defined Term | Attribute Name | Attribute Field Value |
|---|---|---|---|
| Man23 | Benefit Plan State | State | US |
| Man23 | Pharmacy | Pharmacy | No |
| Man31 | Benefit Plan State | State | US |
| | | | |
| | | | |
| | | | |
| | | | |
| | | | |
| | | | |
| | | | |
| ↑ 602 | ↑ 604 | ↑ 606 | ↑ 608 |

| Benefit Plan ID | ID Type | Issuing State/Province | Issuing Country | ID Number | Effective Date | Through Date |
|---|---|---|---|---|---|---|
| | | | Other IDs (Optional) | | | |

| Benefit Plan ID | Other Bill Recipients (Optional) | |
|---|---|---|
| | Billing Party | Recipient ID |

802 → 500, 804, 806

| Benefit Plan ID | Rider Selection (Optional) |
|---|---|
| | Rider Selection |
| Man1 | Authorization |
| Man3 | Under 100K Plan |
| Man4 | Hearing Aides |
| | |
| | |
| | |
| | |
| | |
| | |
| | |
| | |

Figure 9

```
1102 ⌈ benefit plan template                                    ╱─1100
     │ name   "TLC PPO Plan"
     │ effective date   01/01/2015
     ⌊ do not use lock date 1104 ⌈ 1106 ⌈ slot    "Limits"
     │      │ weight   900.00000
     │      ⌊ benefit plan component "Limits, PPO" ,
     │ 1106 ⌈ slot    "Exclusions"
     │      │ weight   1001.00000
     │      ⌊ benefit plan component "Exclusions, PPO" ,
     │ 1106 ⌈ slot    "Authorizations"
     │      │ weight   800.00000
     │      ⌊ benefit plan component "Authorization, PPO" ,
     │ 1106 ⌈ slot    "Deductibles and Maximums"
     │      │ weight   700.00000
     │      ⌊ benefit plan component "Deductibles and Maximums, PPO" ,
     │ 1106 ⌈ slot    "Other Services"
     │      │ weight   500.00000
     │      ⌊ benefit plan component "Other Services, PPO" ,
     │ 1106 ⌈ slot    "Preventative Services"
     │      │ weight   600.00000
     ⌊      ⌊ benefit plan component "Preventative Services, PPO"

1108 ⌈ slot    "Value List"
            ⌊ value list "Over $200K Plan"
 1110
     ⌈ network definition component "Basic PPO"
     ⌈ coverage tier set "Four Tier"
     │ product "TLC PPO" ⌉
     │                    1114
1112⌡ available benefit plan riders ⌉1116
     │     "Over $200K Plan" ,
     │     "Under 100K Plan" ,
     │     "Under 200K Plan"

⌈ funding amount based on  paid amount
```

Figure 11

```
benefit plan
name    "Man PPO 2"
HCC plan id    "Man7"
description    "PPO"
purchased by "AC0000002102"
with
     anniversary date
     first renewal date   01/01/2016
     renewal interval in months   12
effective date   01/01/2015
plan year start date   january   1 situs state   texas calculate
benefits using base product "TLC PPO" benefit plan template "TLC
PPO Plan"
     benefit definition external definition
          benefit plan component  "Limits, PPO"

weight   900.00000
     benefit plan template slot   "Limits" ,
     benefit definition external definition
          benefit plan component  "Exclusions, PPO"

weight   1001.00000
     benefit plan template slot   "Exclusions" ,
     benefit definition external definition
          benefit plan component  "Authorization, PPO"

weight   800.00000
     benefit plan template slot   "Authorizations" ,
     benefit definition external definition
          benefit plan component  "Deductibles and Maximums, PPO"

weight   700.00000
     benefit plan template slot   "Deductibles and Maximums" ,
```

Figure 12

```
                                                                    1200
        benefit definition
1204
            external definition
            benefit plan component  "Other Services, PPO"

weight  500.00000
        benefit plan template slot  "Other Services" ,
        benefit definition external definition
            benefit plan component  "Preventative Services, PPO"

weight  600.00000
        benefit plan template slot  "Preventative Services"
        values definition
1208
            external definition
            value list  "Over $200K Plan"

benefit plan template slot  "Value List"
        network definition
1210
            external definition
            network definition component  "Basic PPO"

funding amount based on   paid amount
    open enrollment periods
            january
            1                            1214
1212    to
            february
            1
    valid coverage tiers  "Four Tier"
    other Ids
1216
        identification number
        type  "BCBS Assn. Plan Code"
        id  "1234567"
        issuing state  "TX"
        issuing country  UNITED STATES
        effective start date  01/01/2015
        effective end date  01/01/3000
    other bill recipients
1218
        recipient  "Test1"
        billing party subscription
```

```
benefit plan template
name    "TLC Medicare"
effective date   01/01/2015
 do not use lock date slot    "Authorizations"
        weight   900.00000
        benefit plan component  "Authorizations, Medicare" ,
        slot    "Exclusions"
        weight  1000.00000
        benefit plan component  "Exclusions, Medicare" ,
        slot    "Limits"
        weight   800.00000
        benefit plan component  "Limits, Medicare" ,
        slot    "Other Services"
        weight   500.00000
        benefit plan component  "Other Services, Medicare" ,
        slot    "Preventative Services"
        weight   600.00000
        benefit plan component  "Preventive Services, Medicare" ,
        slot    "Deductibles and Maximums"
        weight   700.00000
        benefit plan component  "Deductibles and Maximums,
Medicare" ,
        slot    "Rider"
        weight  1100.00000 slot    "Value List"
        value list "Medicare"
network definition component  "Basic Medicare"
coverage tier set "Four Tier"
product "TLC Medicare"
available benefit plan riders
        "Hearing Aides"
funding amount based on   paid amount
```

1402 brackets the block starting at slot "Authorizations" through the Rider section.
1404 brackets slot "Rider" / weight 1100.00000.

Figure 14

```
                              ←1500 benefit plan rider
    name   "Hearing Aides"
    HCC id   "Hearing"
    effective date   01/01/1800
    rider type "RX"
    benefit plan component selections
         add benefit plan component
         "Hearing Aids, Medicare"
         in slot   "Rider"
```

Figure 15

```
benefit plan
name    "Man Medicare"                                    1600
HCC plan id   "Man4"
description    "Medicare"
purchased by  "AC0000002102"
with
     anniversary date
     first renewal date   01/01/2016
     renewal interval in months   12
effective date   01/01/2015
plan year start date   january   1 situs state   texas calculate
benefits using base product "TLC Medicare" benefit plan
template "TLC Medicare"
         benefit definition external definition
         benefit plan component  "Authorizations, Medicare"

weight   900.00000
     benefit plan template slot   "Authorizations" ,
     benefit definition external definition
         benefit plan component  "Exclusions, Medicare"

weight   1000.00000
     benefit plan template slot   "Exclusions" ,
     benefit definition external definition
         benefit plan component  "Limits, Medicare"

weight   800.00000
     benefit plan template slot   "Limits" ,
     benefit definition external definition
         benefit plan component  "Other Services, Medicare"

weight   500.00000
     benefit plan template slot   "Other Services" ,
```

Figure 16

```
                                                        ┌─1600
         benefit definition                             ▼
1602│
    │        external definition
    │        benefit plan component  "Preventive Services, Medicare"

weight  600.00000
         benefit plan template slot  "Preventative Services" ,
         benefit definition external definition
                benefit plan component  "Deductibles and Maximums,
    Medicare"

weight  700.00000
         benefit plan template slot  "Deductibles and Maximums" ,
     ┌── benefit definition
1702│
    │        external definition
    │        benefit plan component  "Hearing Aids, Medicare"
    │
    │   weight  1100.00000
    │   benefit plan template slot  "Rider"
    └── benefit plan rider  "Hearing Aides"

values definition external definition
                value list  "Medicare"

benefit plan template slot  "Value List"

network definition external definition
                network definition component  "Basic Medicare"

funding amount based on  paid amount
1704 valid coverage tiers "Four Tier"
   └─ chosen riders "Hearing Aides"
```

Figure 17

```
                                                     ┌─1800
     benefit plan template
     name    "TLC HDHP Plan"
     effective date   01/01/2015
      do not use lock date 1802 1804 ┌ slot   "Authorizations"
          │ weight  900.00000
          │ benefit plan component "Authorization, HDHP" ,
          │ slot   "Deductibles and Maximums"
          │ weight  700.00000
          │ benefit plan component "Deductibles and Maximums, HDHP" ,
          │ slot   "Exclusions"
          │ weight  1000.00000
          │ benefit plan component "Exclusions, HDHP" ,
          │ slot   "Limits"
          │ weight  800.00000
          │ benefit plan component "Limits, HDHP" ,
          │ slot   "Other Services"
          │ weight  500.00000
          │ benefit plan component "Other Services, HDHP" ,
          │ slot   "Preventative Services"
          │ weight  600.00000
          └ benefit plan component "Preventative Services, HDHP"

slot   "Value List"
       value list "HDHP Plan"
     network definition component "Basic PPO"
     coverage tier set "Four Tier"
     product "TLC PPO"
     available benefit plan riders
         "Authorization"
     funded as   fully insured
     funding amount based on   paid amount
```

Figure 18

```
                          1900
benefit plan rider
name  "Authorization"
HCC id  "Auth"
effective date  01/01/1800
rider type "RX"
benefit plan component selections
     remove benefit plan component
     in slot  "Authorizations"
```

Figure 19

```
benefit plan
name    "Man HDHP"
HCC plan id    "Man1"
description    "HDHP"
purchased by "AC0000002102"
with
     anniversary date                              ←—2000
         first renewal date   01/01/2016
         renewal interval in months   12
effective date  01/01/2015
plan year start date   january  1 situs state   texas calculate
benefits using base product "TLC PPO" benefit plan template
"TLC HDHP Plan"
     benefit definition external definition
         benefit plan component  "Deductibles and Maximums, HDHP"

weight   700.00000
     benefit plan template slot   "Deductibles and Maximums" ,
     benefit definition external definition
         benefit plan component  "Exclusions, HDHP"

weight   1000.00000
     benefit plan template slot   "Exclusions" ,
     benefit definition external definition
         benefit plan component  "Limits, HDHP"

weight   800.00000
     benefit plan template slot   "Limits" ,
     benefit definition external definition
         benefit plan component  "Other Services, HDHP"

weight   500.00000
     benefit plan template slot   "Other Services" ,
```

2004, 2002 annotations point to the benefit definition block.

Figure 20

```
                                                            ┌─2000
                                                           ∕
      ┌─ benefit definition
      │
      │       external definition
 2002 │       benefit plan component  "Preventative Services, HDHP"
      │
      │  weight    600.00000
      │  benefit plan template slot  "Preventative Services"
      └─ values definition external definition
                 value list  "HDHP Plan"

benefit plan template slot  "Value List"

network definition external definition
                 network definition component  "Basic PPO"

funded as   fully insured
      funding amount based on   paid amount
 2102 valid coverage tiers  "Four Tier"
   ┌─ chosen riders  "Authorization"
```

Figure 21

```
                                        ← 2200 benefit plan rider
name   "Under 100K Plan"
HCC id   "Under 100K Plan"
description   "TLC PPO"
effective date   01/01/2015
rider type "Cost Sharing"
value list selections
     replace value list
     "Under 100K Plan"
     in slot   "Value List"
```

Figure 22

```
benefit plan
name     "Man PPO 3"                                    ← 2300
HCC plan id    "Man3"
description    "PPO"
purchased by "AC0000002102"
with
      anniversary date
      first renewal date   01/01/2016
      renewal interval in months    12
effective date   01/01/2015
plan year start date   january   1 situs state   texas calculate
benefits using base product "TLC PPO" benefit plan template
"TLC PPO Plan" benefit definition external definition benefit
plan component "Limits, PPO"

weight   900.00000
      benefit plan template slot    "Limits" ,
      benefit definition external definition
            benefit plan component   "Exclusions, PPO"

weight   1001.00000
      benefit plan template slot    "Exclusions" ,
      benefit definition external definition
            benefit plan component   "Authorization, PPO"

weight   800.00000
      benefit plan template slot    "Authorizations" ,
      benefit definition external definition
            benefit plan component   "Deductibles and Maximums, PPO"

weight   700.00000
      benefit plan template slot    "Deductibles and Maximums" ,
```

Figure 23

```
                                                    ┌─2300
    benefit definition external definition
        benefit plan component  "Other Services, PPO"

weight  500.00000
    benefit plan template slot   "Other Services" ,
    benefit definition external definition
        benefit plan component  "Preventative Services, PPO"

weight  600.00000
    benefit plan template slot   "Preventative Services"

┌─ values definition
 │
 │      external definition
2402    value list "Under 100K Plan"
 │
 │  benefit plan template slot   "Value List"
 └─ benefit plan rider "Under 100K Plan"

network definition external definition
        network definition component  "Basic PPO"

funding amount based on  paid amount
2404 valid coverage tiers "Four Tier"
  ┌─ chosen riders "Under 100K Plan"
```

Figure 24

| HRL File Name | Benefit Plan ID | Template Name | Rider Action Required | Time Stamp | Messages |
|---|---|---|---|---|---|
| BenefitPlan.LayoutExample.1800-01-01.a | Man15 | Test Template 1 Test Template | No | 3/10/2015 | |
| BenefitPlan.GobleSimplePlan.1800-01-01.a | BLT-12 | Simple | Yes | 3/10/2015 | |
| NA | BLT-1 | TLC PPO | Yes | 3/10/2015 | Account ID not provided Required data element for Other IDs |
| BenefitPlan.LayoutRider.1800-01-01.a | Man16 | TLC PPO | Yes | 3/10/2015 | was not provided |

Figure 25

MACHINE FOR GENERATING UNSTRUCTURED SYNTAX

CROSS-REFERENCE TO RELATED APPLICATIONS

This application is a continuation of U.S. patent application Ser. No. 15/223,732 filed Jul. 29, 2016, which claims the benefit of U.S. Provisional Application No. 62/328,451, filed Apr. 27, 2016, and U.S. Provisional Application No. 62/330,737, filed May 2, 2016, all of which are incorporated by reference.

TECHNICAL FIELD

This disclosure relates to machines and complex system architectures for conversion of data from a normalized format to an unstructured syntax format.

BACKGROUND

Generally, a human can read unstructured syntax formats with greater ease than structured syntax formats. Accordingly, some organizations are moving toward data structures including unstructured syntax formats for ease of use and review by humans. The process of creating files including unstructured syntax formats can be time-consuming and expensive and can present opportunity for user error.

BRIEF DESCRIPTION OF THE DRAWINGS

FIG. 5 illustrates an example of a Benefit Autoloader file.

FIG. 6 illustrates a view of another portion of the Benefit Autoloader file shown in FIG. 5.

FIG. 7 illustrates a view of another portion of the Benefit Autoloader file shown in FIG. 5.

FIG. 8 illustrates a view of another portion of the Benefit Autoloader file shown in FIG. 5.

FIG. 9 illustrates a view of another portion of the Benefit Autoloader file shown in FIG. 5.

FIG. 11 illustrates an example benefit template file.

FIG. 12 illustrates an example benefit plan file.

FIG. 13 illustrates a continuation of the example benefit plan file shown in FIG. 12.

FIG. 14 illustrates another example benefit template file.

FIG. 15 illustrates an example benefit rider file.

FIG. 16 illustrates another example benefit plan file.

FIG. 17 illustrates a continuation of the example benefit plan file shown in FIG. 16.

FIG. 18 illustrates another example benefit template file.

FIG. 19 illustrates another example benefit rider file.

FIG. 20 illustrates another example benefit plan file.

FIG. 21 illustrates a continuation of the example benefit plan file shown in FIG. 20.

FIG. 22 illustrates another example benefit rider file.

FIG. 23 illustrates another example benefit plan file.

FIG. 24 illustrates a continuation of the example benefit plan file shown in FIG. 23.

FIG. 25 illustrates an example validation report.

DETAILED DESCRIPTION

Extraction Transformation Load (ETL) processes are typically conversions of normalized or structured data (e.g., in rows and columns) in a source database into a different form of normalized or structured data in another target database. However, according to various embodiments of the present disclosure, the target database and target format may be an unstructured syntax format. The unstructured syntax may not include rows and columns of data or tabular data and instead may include strings, lines, or paragraphs of unstructured syntax. One useful aspect of unstructured syntax is that a user may be shown specific business language for how a claim may be processed (e.g., priced) that is inherent to and present in the unstructured syntax within the particular file.

A machine for generating unstructured syntax may be provided to convert structured or normalized data (e.g., data existing in tables or in row/column structured) into unstructured syntax. The machine may receive structured data in the form of a table and may convert the data into files or documents including unstructured syntax. The machine may perform the conversion according to various rules or logic that define the actions that the machine takes to perform the conversion. The machine may receive source (input) data and process the data to output files in the unstructured syntax format according to the business rules and logic.

In addition to ETL processes, the disclosed processes may also be understood as an Extract, Convert, Transform, Validate, Load (ECTVL) process, including the additional steps of data conversion and data validation.

Various benefits of the disclosed machine and processes include: Successful integration of converted contracts; Automation of all processes from extract to unstructured record file generation; Fast conversion resulting in a few seconds/minutes as opposed to weeks; Error free data conversion process; Efficient validation of data; Reusable code; Easily distributable; Can be consumed as a service; Robust and fast application implementing techniques such as, multithreading, caching, and others.

Figure 1:
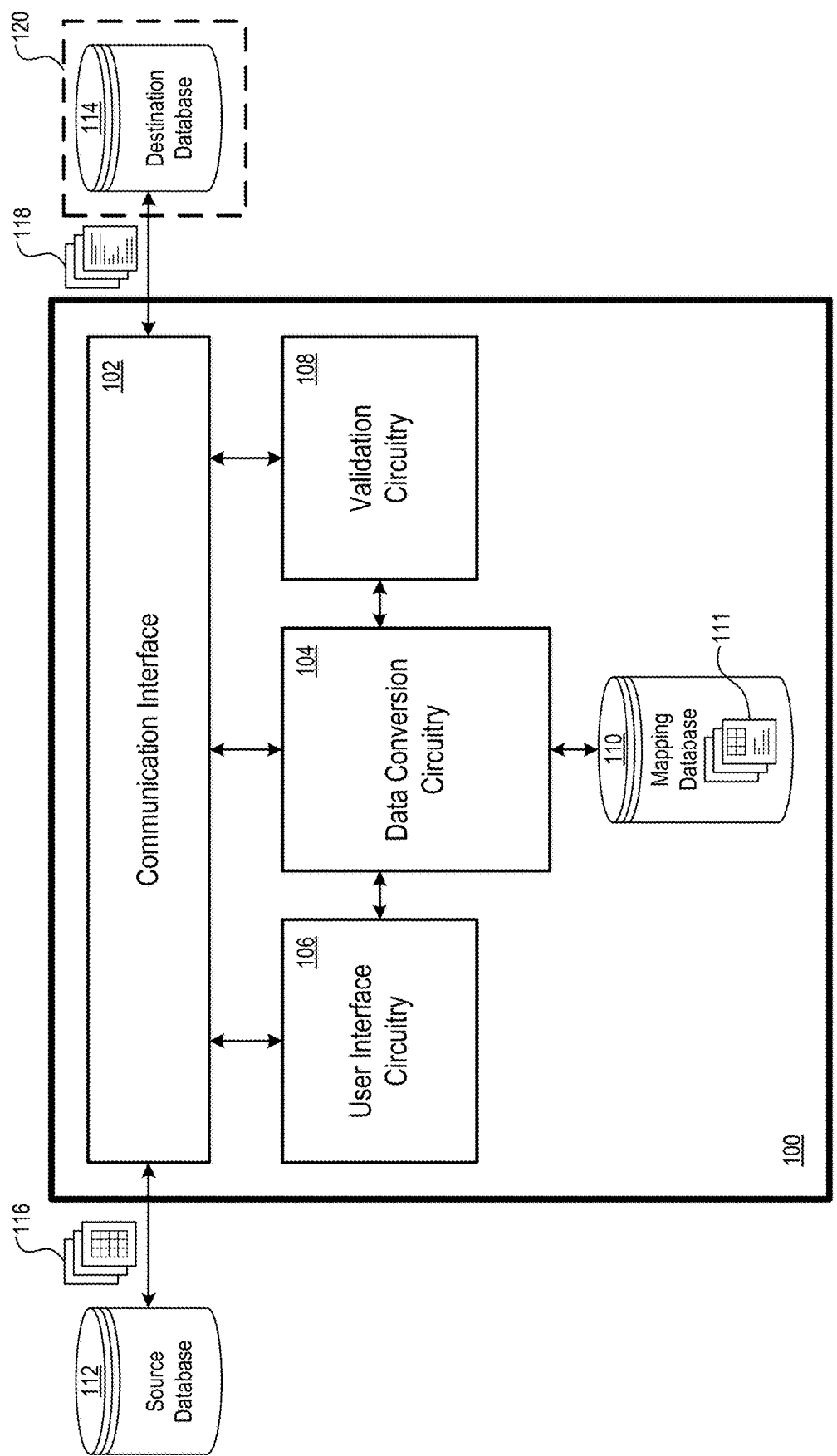
FIG. 1 shows an example block diagram of a machine for generating unstructured syntax.

FIG. 1 illustrates an example machine 100 for generating unstructured syntax. The machine 100 includes a communication interface 102, data conversion circuitry 104, user interface circuitry 106, and validation circuitry 108. The machine 100 may include or may be coupled to a mapping database 110, which may store field mapping files 111. The communication interface 102 is coupled to the data conversion circuitry 104, the user interface circuitry 106, and, in some embodiments, the validation circuitry 108. The data conversion circuitry 104 is coupled to the user interface circuitry 106, the validation circuitry 108, and the mapping database 110. The machine 100, and in particular, the communication interface 102, may be coupled to or in communication with a source database 112 and a destination database 114.

The data conversion circuitry 104 may retrieve and receive structured records 116 from the source database 112 through the communication interface 102. The data conversion circuitry 104 may also execute a syntax conversion on the structured records 116 to generated unstructured records 118 complying with a pre-defined unstructured target output syntax. After generating the unstructured records 118, the data conversion circuitry 104 may deliver the unstructured records 118 to the destination database 114 through the communication interface 102.

The destination database 114 may be part of a target destination system 120 that uses the unstructured records 118 and the unstructured syntax stored within the unstructured records 118 to perform various tasks or processes. For example, the target destination system 120 may be a health care provider or an insurance service provider that uses the unstructured records 118 to process healthcare contracts and healthcare claims. The machine 100 may interface with the destination database 114 or the target destination system 120 to load the unstructured records 118 into the target destination system 120.

Figure 2:
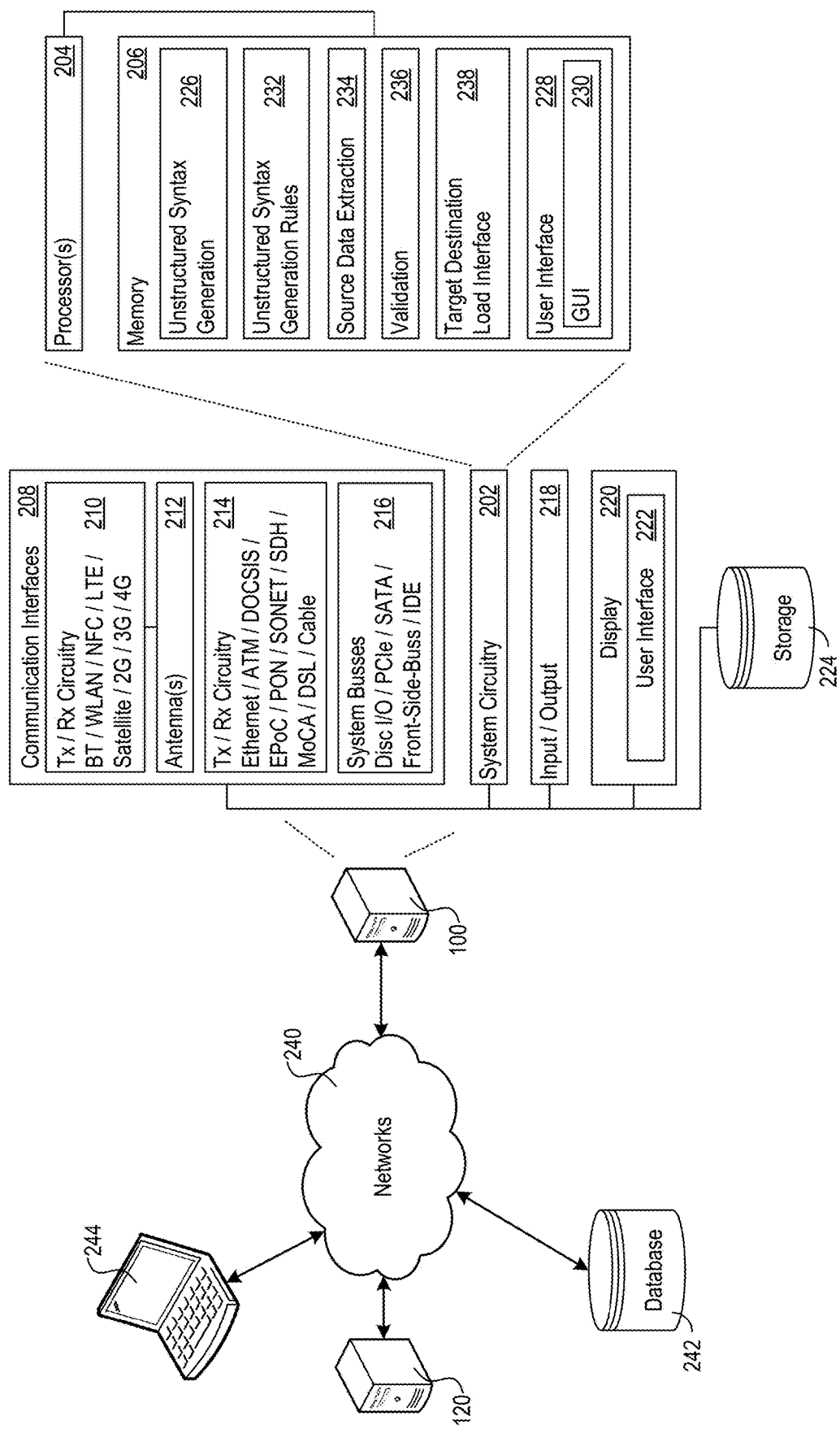
FIG. 2 shows an example specific system implementation for the machine.

FIG. 2 shows an example specific system implementation 200 for the machine 100. According to the system implementation, the machine 100 includes system circuitry 202 to support implementation of the various circuitry elements and functionality discussed above with respect to FIG. 1 and elsewhere. In one embodiment, the system circuitry 202 includes processors 204, memory 206, and/or other circuitry. The processors 204 may be connected to the memory 206 and may comprise a memory system including a plurality of memory devices collocated or distributed across multiple systems. The memory 206 may store control instructions, operational parameters for the control instructions, datasets, and other information. The control instructions may be executed by the processor 204 to implement any of the processing or methods described below, according to a configuration set by the operational parameters. Further, in some embodiments, various circuitry elements of the machine 100 may be implemented by the system circuitry 202.

The memory 206 may store data and instructions for use or execution by the circuitry elements and/or to implement portions of the circuitry elements or to perform various steps of the different methods discussed below. In one embodiment, the memory 206 includes unstructured syntax generation instructions 226. The processors 204, memory 206, and unstructured syntax generation instructions 226 may implement portions of the various circuitry elements discussed above. The memory 206 may also include unstructured syntax generation rules 232, source data extraction instructions 234, and validation instructions 238, each of which may be used to implement all or portions of the various circuitry elements discussed above. Similarly, the memory 206 may include user interface instructions 228, which may further include graphical user interface (GUI) instructions and data 230. The processors 204, memory 206, user interface instructions 228 and GUI instructions and data 230 may implement portions of the user interface circuitry.

The machine 100 may also include communication interfaces 208, which may support wireless communication via wireless communication circuitry 210 and antennas 212. Example wireless communication protocols may include Bluetooth, Wi-Fi, WLAN, near field communication protocols, cellular protocols (2G, 3G, 4G, LTE/A), and/or other wireless protocols. Also, communication interface 208 may include wired communication circuitry 214. Example wired communication protocols may include Ethernet, Gigabit Ethernet, asynchronous transfer mode protocols, passive and synchronous optical networking protocols, Data Over Cable Service Interface Specification (DOCSIS) protocols, EPOC protocols, synchronous digital hierarchy (SDH) protocols, Multimedia over coax alliance (MoCA) protocols, digital subscriber line (DSL) protocols, cable communication protocols, and/or other networks and network protocols. The communication interfaces 208 may be connected or configured to connect to the networks 240, including the Internet or an intranet, to enable the machine 100 and the system circuitry 202 therein to communicate with other systems and devices. Additionally, the communication interface 208 includes system busses 216 to effect intercommunication between various elements, components, and circuitry portions of the machine 100. Example system bus implementations include PCIe, SATA, and IDE based buses.

The communication interfaces 208 may enable interconnection of various circuitry components illustrated in FIG. 1 within the machine 100 (e.g., via one or more buses, computer component interfaces, or peripheral component interfaces). For example, the communication interfaces 208 may couple to circuitry elements and databases internally via system busses 216 if internally maintained, or externally via the wireless communication circuitry 210 or the wired communication circuitry 214 if externally maintained. The communication interfaces 208 may also support communication with remote storage database 242, client device 244, or target destination system 120.

The communication interfaces 208 may support communication with external client devices 244. Communication with the external client devices 244 may be effected through user interface circuitry and/or with user interface instructions 228. A dynamically reconfigurable GUI may be provided to the external client devices 244 via the networks 240 to enable interaction between the client devices 244 and the machine 100. In one example, the machine 100 comprises a web server capable of providing web services or web pages to the client device 244.

In some embodiments, the machine 100 may itself include various I/O interfaces 218 and/or a display 220, for example, to enable local interaction with the various circuitry elements discussed above instead of or in addition to interaction over the networks 240 with a remote client device 244. In some examples, the display 220 can provide a user interface 222 to a local user, which can be the same as or a variation of a user interface that can be provided to a remote client device 244 (discussed below).

Additionally, the I/O interfaces 218 and display 220 may enable local maintenance engineers to interact with the machine 100. A local GUI may be provided via the local display 220 to present a control dashboard, actionable insights and/or other information to a maintenance engineer. The local GUI may support portable access, such as, via a web-based GUI, to enable maintenance on the machine 100 or other interaction with the machine 100. This local GUI may be the same as or different from the GUI described elsewhere. The machine 100 may also include a storage drive 224 (e.g., a hard drive, solid-state drive, or other memory system) to enable local storage of system software, user interfaces, or system instructions.

User interface circuitry may be coupled to a user interface database, which may store logic, instructions, code, images, or other content necessary to generate and provide a user interface, and in particular, a graphical user interface (GUI). The various databases may be implemented on multiple distinct storage devices (e.g., memories or hard drives), on a single storage device, or on a combination thereof. For example, some storage databases may be implemented on a common shared storage device, while other storage databases may be implemented on other distinct storage devices. These storage devices may be local to the machine, for example, housed within the machine or directly connected to the machine. Alternatively, the storage devices, for example, remote database 242, may be connected to the machine 100 over networks 240 such as an intranet (e.g., local) or via the Internet.

The machine 100 may be coupled to one or more networks 240, which may include the Internet or an intranet. Other devices and/or system may also be connected to the networks 240, including, for example, one or more databases 242, target destination system 120, or client devices 244. The data conversion circuitry 104 may generate the unstructured records 118 for the purpose of loading or storing the unstructured records 118 in the target destination system 120 for use by the target destination system 120.

The client device 244 may include, for example, a computer (e.g., laptop), a smartphone, or another electronic device capable of communicating with the machine 100 via the networks 240 or directly. The client device 244 may be a computing device which allows a user to connect to a network 240, such as the Internet. Examples of a client device 244 include, but are not limited to, a personal computer, personal digital assistant ("PDA") a laptop, a smartphone, a cellular phone, a tablet, or another electronic device. The client device 244 may include a keyboard, keypad, a touch screen interface, or a cursor control device, such as a mouse, or a joystick, a display device, a remote control, and/or any other device operative to view and interact with a user interface. In one embodiment, the client device 244 is configured to request and receive information from the networks 240, for example, using a web browser, such as INTERNET EXPLORER® (sold by Microsoft Corp., Redmond, Wash.) or FIREFOX® (provided by Mozilla). Alternatively, the client device 244 may couple directly to the machine 100 (e.g., via a direct connection or via a local intranet). In another embodiment, the client device 244 and the machine 100 are implemented on the same system, e.g., on a laptop or other computing device. Further technical operational details of the machine 100 are provided below.

In certain embodiments, the user interface circuitry 106 may provide an interface, such as a graphical user interface (GUI) to a remote client device 244 via the networks 240 (e.g., the Internet). The GUI may be provided as a part or portion of a larger software tool or service offering. The GUI may be displayed on a client device 244 or locally via a local display 220. The GUI may be implemented via a web browser operating on the client device 244 and may be display and/or navigated as a web page. Alternatively, the GUI may be implemented as a stand-alone or interconnected software application running on the client device 244.

Figure 3:
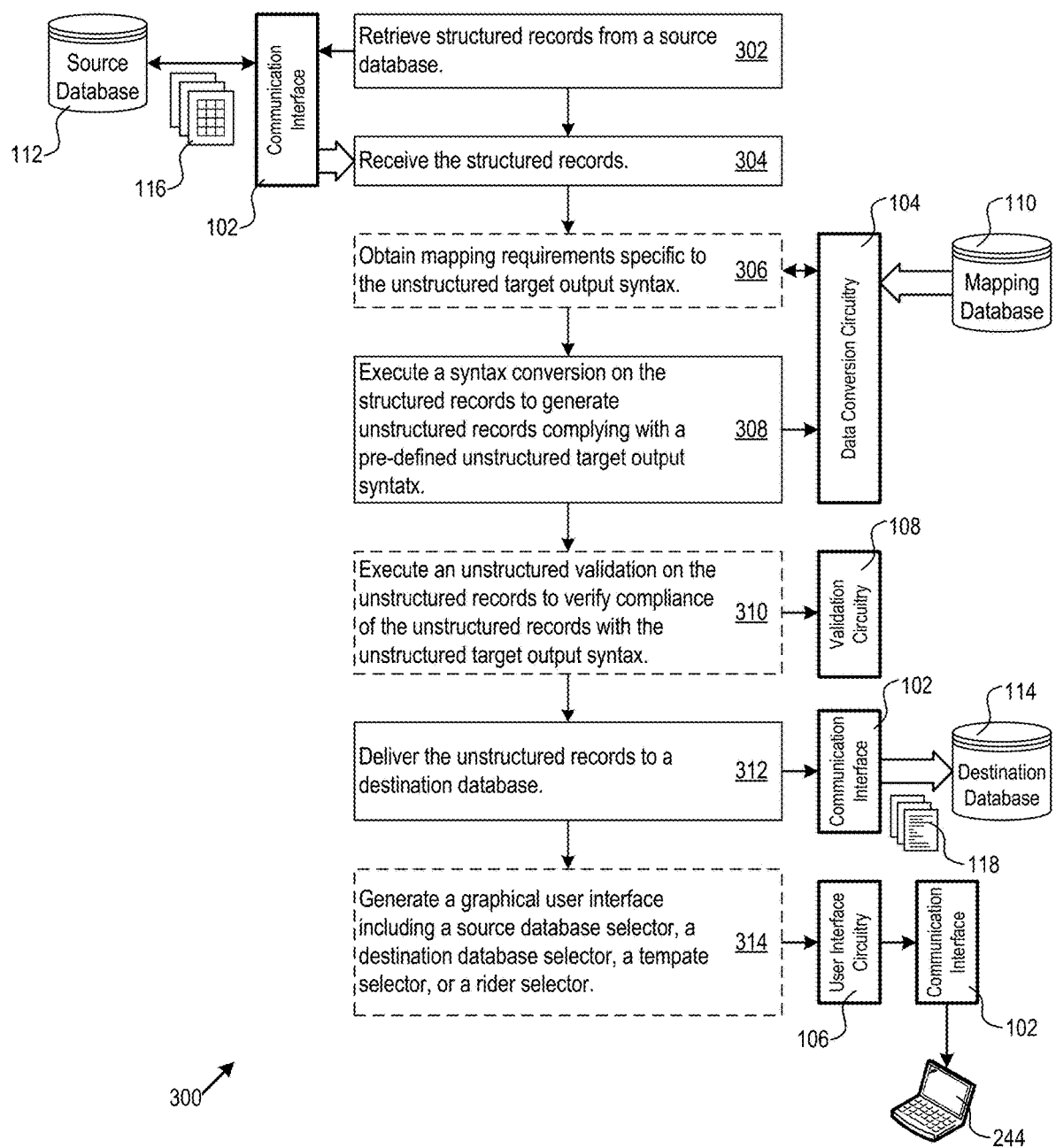
FIG. 3 shows a flow diagram of logic that the machine may implement.

FIG. 3 shows flow diagram of logic 300 that the machine 100 may implement to generate unstructured records 118 including unstructured syntax. The communication interface 102 may retrieve structured records 116 from the source database 112 (302). In one example, the structured records 116 include health provider data or insurance provider data, which may include industry standard descriptors. The data conversion circuitry 104 may then receive the structured records 116 (304). In some embodiments, the data conversion circuitry 104 may obtain mapping requirements specific to the unstructured target output syntax (306). The data conversion circuitry 104 may obtain the mapping requirements from a pre-configured field mapping between the structured records 116 and the unstructured records 118.

The data conversion circuitry 104 may execute a syntax conversion on the structured records to generate unstructured records 118 complying with a pre-defined unstructured target output syntax (308). In some embodiments, the validation circuitry 108 or the data conversion circuitry 104 may execute an unstructured validation on the unstructured records 118 to verify compliance of the unstructured records 118 with the unstructured target output syntax (310). The data conversion circuitry 104 may deliver the unstructured records 118 to the destination database 114 through the communication interface 102 (312).

Additionally, the user interface circuitry 106 or the data conversion circuitry 104 may generate a graphical user interface including: a source database selector, a destination database selector, a template selector, a rider selector, a field mapping selector, an unstructured target output syntax selector, or any combination thereof.

In other embodiments, the machine 100 may include various other components and be configured to execute various other steps or processes. For example, the machine 100 may include the data conversion circuitry 104 that is configured to determine an unstructured syntax requirement for converted data stored in the destination database 114, the unstructured syntax requirement comprising a natural language output rule, comprising, for example unstructured syntax. The data conversion circuitry 104 may request the structured records 116 from the source database 112 and execute a syntax conversion on the structured records 116 to generate the converted data in compliance with the unstructured syntax requirement and the natural language output rule. The data conversion circuitry 104 may determine the unstructured syntax requirement from a pre-defined field mapping file including pre-defined syntax field mapping established for the syntax conversion, which pre-defined syntax field mapping may include a target destination system specific process decomposition.

The syntax field mapping may include unstructured syntax to be included as part of converted data. Further, the syntax field mapping may include a source indicator for additional information to be included within the unstructured syntax to be included as part of the converted data. The source indicator may indicate that the additional information is to be pulled from the structured records, from a template, or from a rider. In one embodiment, the target destination system specific process decomposition distinguishes between a process plan, and individual process requirements included in the process plan. In another embodiment, the target destination system specific process decomposition distinguishes between a process plan, and applicable value definitions within the process plan. In another embodiment, the target destination system specific process decomposition distinguishes between a process plan, and an applicable network definition within the process plan.

In another embodiment, the target destination system specific process decomposition includes unstructured syntax to be included as part of the converted data, a section name for the unstructured syntax, a mandatory/condition flag for the unstructured syntax, an order-of-execution field for the unstructured syntax, or a processing rule for the unstructured syntax. The target destination system specific process decomposition may also include a syntax complexity specifier for the unstructured syntax. The processing rule may include a data directive to pull data conversion items from a pre-defined template, a rider, or the structured records to facilitate the syntax conversion. The processing rule may also include an output directive to create an output syntax component with the data conversion items for any of a slot specifier, weight specifier, or component specifier present in the pre-defined template.

Figure 4:
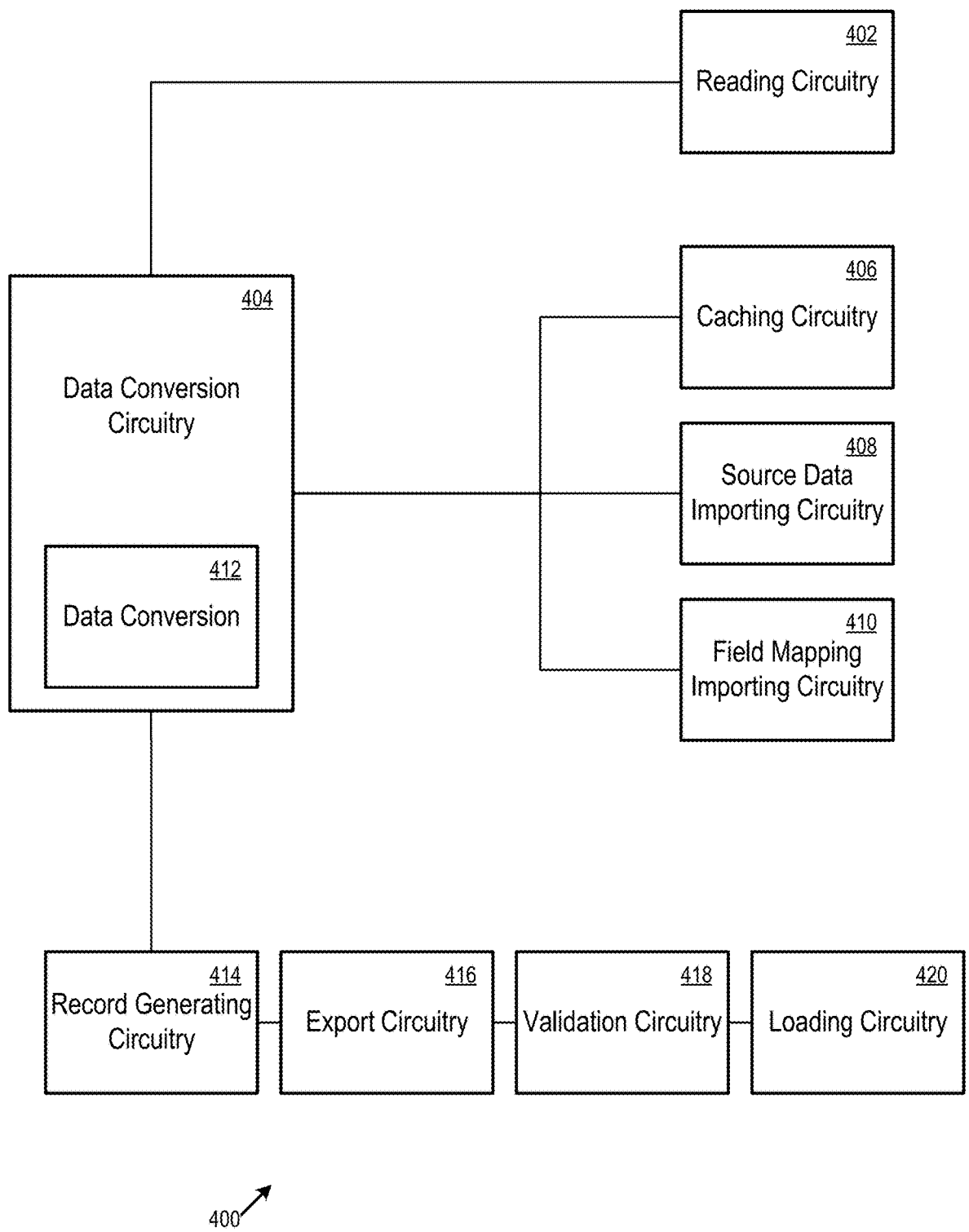
FIG. 4 shows a diagram of various components or circuitry elements of the machine and of the overall system.

FIG. 4 illustrates a diagram 400 of various components or circuitry elements of the machine 100 and of the overall system. Reading circuitry 402 may read source data, for example, included within a structured record 116. The source data may exist as structured or normalized data. The reading circuitry 402 may then communicate the source data to data conversion circuitry 404, which may be the same as data conversion circuitry 104 in FIG. 1. The data conversion circuitry 404 may communicate with caching circuitry 406 to cache the source data read by the reading circuitry 402. Source data importing circuitry 408 imports portions of or the entirety of the cached source data into a database (DB). Field mapping importing circuitry 410 imports the field mapping within a field mapping file 111 into the DB. This may include the field mapping importing circuitry 410 importing unstructured syntax from the field mapping file 111 for use in the generated unstructured record 118. The data conversion circuitry 404 may also include or be coupled to a data conversion component 412 that performs the conversion of the data from the structured records 116 into the unstructured records 118. The conversion is dictated by the source data within the structured records 116 and the field mapping from the field mapping file 111 stored in the DB by the source data importing circuitry 408 and the field mapping importing circuitry 410, respectively. Unstructured record generation circuitry 414 generates the unstructured records in the proper file format (e.g., Health Rules Language (HRL) file format) from the converted data received from the data conversion component 412. Export circuitry 416 exports the generated unstructured record output file to validation circuitry 418, which in turn performs a validation procedure on the unstructured record. Loading circuitry 420 loads the validated unstructured records to a target destination system (e.g., HealthEdge). The system may also provide a GUI to implement some of the functions, or user control of the functions, discussed above.

The embodiments of FIG. 1 and FIG. 4 each illustrate examples of a high-level system diagrams, which may include the machine 100. The systems generate unstructured records (e.g., HRL files including unstructured syntax) from structured records (e.g., source structured records) according to mapping requirements (e.g., the field mapping) and stores the unstructured records in a database. The systems may implement loading of the unstructured records into a target destination system (e.g., Health Edge). Various frameworks or tools may be utilized with to provide some of the functionality of the circuitry elements discussed above, including: Spring 4 and JEE 7; JavaSE 1.8, Core Java; Apache POI 3.11, Read excels; Hibernate 4, Persist data; JavaScript, GUI; MySQL DB or SQL Server, staging; Spring batch; or other tools.

In various embodiments, the machine 100 includes an autoloader function. In this capacity, the machine 100 receives batches of structured records and processes and converts the structured data within the structured records to generate the unstructured records, including unstructured syntax. The machine 100 then loads the unstructured records in a target destination system. In these embodiments, the machine 100 can create and load unstructured records in mass, which eliminates the need to manually configure each of the unstructured records one by one through manual coding or via another interface. In an insurance provider application setting, the machine 100 can automate, for example, up to 97% of provider contract configurations for large international payor releases. By automating high volume Benefit Plan loads, the machine 100 bypasses numerous manual user steps. Further, the machine 100 can leverage same architectures to convert and generate other file types, including service categories, Nation Drug Code (NDC) code files, and fee schedule auto-maintenance files. The autoloader function can be executed at the machine 100 via a service call, which can, for example, be tailored for further client systems integrations. In these configurations, the machine 100 may auto load new benefit plans using plan templates and riders. Additionally, the machine 100 may also auto load modifications to previously configured benefit plans using plan templates and riders. Further still, the machine 100 may drive variances between plans using the source input structured records.

In various specific implementations, the machine 100 may be configured to generate multiple benefit plans for a provider (e.g., an insurance provider), or multiple benefit plans that may be offered by an employer or as part of an insurance exchange. The benefit plans are real-world agreements between a single account and a healthcare company that defines one benefit plan that is available to employees or members of that account. Each of the benefit plans is defined by a benefit plan file, which are the unstructured records, each of which includes unstructured syntax. The unstructured syntax may appear or read like natural language, which improves the human usability of the benefit plan files. The multiple benefit plans may be uploaded to the target destination system 120 (e.g., HealthEdge). Each provider or employer may provide many different benefit plan options. For example, a larger national or international corporation may provide employees with any number of different benefit plan options (e.g., a Health Maintenance Organization (HMO) plan or a Preferred Provider Organization (PPO) plan). Further, each state, jurisdiction, or market in which the benefit plan is offered may have different requirements (e.g., state-level mandates) or may include different market-driven offerings or pricing (e.g., different deductibles, co-pays, or premiums). Thus, a large national organization may be faced with a large number of benefit plan files to create and upload to the target destination system 120. For example, if the organization offers five different benefit plan options across all 50 states, the organization may be required to create 250 different benefit plan files. Creation of the many benefit plan files can be time-consuming and expensive and may present opportunities for human error. The machine 100 can implement the autoloader function to automatically generate the benefit plan files without concern for human error during individual benefit plan file creation.

The machine 100 can create the benefit plan files including the unstructured syntax, which unstructured syntax can reference or call out benefit plan components. The benefit plan components may be stored within the target destination system 120, for example, within destination database 114 or another database. The benefit plan components are a collection of related rules that can be included within a benefit plan. Benefit plan components may specify various particular aspects of a benefit plan, including, for example, in/out of network rules, out of pocket maximums, lifetime and annual limits, exclusions, deductibles, and service authorizations. One example of a benefit plan may be a vision rider, which may contain all the benefit rules related to a vision benefit that the account could offer to its employees. One example benefit rule may be "Benefit member for Service Category 'Office Visit' 100% of service cost copayment of $10.00 per unit." Individual benefit rules may be grouped into benefit tiers, which can be written using placeholder variables. For example, the benefit rule above may be written as follows: "Benefit member for Service Category 'Office Visit' 100% of service cost copayment of 'In-Network Office Co-pay' per unit."

The target destination system 120 may also include benefit plan templates and benefit plan riders. The benefit plan templates define a base benefit plan that may be referenced or re-used in the creation of the multiple specific benefit plans (e.g., the benefit plans for each state). The benefit plan riders may instruct the machine 100 to perform modifications to the benefit plan templates to create the multiple individual benefit plans. A benefit autoloader file 500 (see below) may be utilized to instruct the machine 100 as to which benefit plan templates and benefit plan riders to utilize for creation of each of the multiple individual benefit plans. The benefit plan templates and the riders may be files that include data in structured or unstructured formats. A user or system may create the benefit plan templates and benefit plan riders for use in the multiple individual benefit plans that will be created according to the benefit autoloader file 500.

Turning now to FIGS. 5-10, various aspects of an example structured record file are illustrated. The example structured record file comprises a benefit autoloader file 500 that may be used within a benefit plan creation context discussed above. The benefit autoloader file 500 includes structured or normalized data in row and column format, e.g., such as an Excel spread sheet, and may also be called an input grid. The benefit autoloader file 500 is completed by a user and includes the details for each benefit plan to be generated by the machine 100.

The benefit autoloader file 500 includes multiple rows, where each row represents a different benefit plan that will be provided or offered by the insurance provider. Each benefit plan will in turn be represented by a separate unstructured record generated by the machine 100. Thus, each row corresponds to a separate unstructured record (e.g., individual benefit plan file) which the machine 100 will generate. The benefit autoloader file 500 includes a benefit plan template column 502, which serves to call the base benefit plan template that serves as the base for the creation of the particular benefit plan which the machine 100 creates. The benefit autoloader file 500 includes an Account ID column that indicates the particular account holder (e.g., employer or provider) of the benefit plan. The benefit autoloader file 500 includes a benefit plan name column 506 that includes a generalized name for a benefit plan offered by the account (e.g., PPO option 2, or HMO). The benefit autoloader file 500 also includes a benefit plan ID column 508, which identifies the particular benefit plan, which may be one of many different versions (e.g., one for each state) of a certain plan offered (e.g., PPO option 2 plan for the state of Texas). The benefit autoloader file 500 also includes a benefit plan description column 510, which provides a general description of the benefit plan. A situs state column 512 indicates the state in which the benefit plan is being offered, while a file creation date column 514 and effective date column 516 each indicate a date in which the file was created or is effective, respectively. An action column 518 indicates the type of action being performed for the benefit plan (e.g., a new benefit plan or a modification to an existing benefit plan). A plan renewal interval column 520 indicates the number of months at which a benefit plan can be renewed (e.g., 12 months). A plan start column 522 and renewal date column 524 indicate the start date and renewal dates for the particular benefit plan. A HDHP column 526 indicates whether a benefit plan is a high deductible health plan. A funded as column 528 indicates whether a benefit plan is a fully insured benefit plan. Columns 502-528 may form the header level information for the benefit plans. The header level information may be required for the machine 100 to properly generate the multiple benefit plan files.

The benefit autoloader file 500 may also include open enrollment period information, which may include columns 530-538, and which may be optional. The open enrollment period information may include a from month column 530 and a from day column 532 that, together, indicate the date which open enrollment begins. Similarly, the open enrollment period information may include a to month column 534 and a to day column 536 that, together, indicate the date which open enrollment ends. The open enrollment period information may also include a Medicare enrollment period column 538 to indicate particular dates for Medicare enrollment.

FIG. 6 includes other aspects of the benefit autoloader file 500, including a selection of user defined terms, which may be optional for the creation of the multiple benefit plan files. A benefit plan ID column 602 includes benefit plan IDs (e.g., corresponding to one or more benefit plan IDs in column 508) in which a user-defined term is included in the source data or is to be included in the generated benefit plan files. A user defined term column 604 indicates a term which the user has defined, while an attribute name column 606 indicates the attribute to which the user defined term is to be applied. An attribute field value column 608 includes the value that is to be assigned to the particular attribute.

FIG. 7 includes other aspects of the benefit autoloader file 500, including a selection of other IDs, which may be optional for the creation of the multiple benefit plan files. A benefit plan ID column 702 includes benefit plan IDs (e.g., corresponding to one or more benefit plan IDs in column 508) into which the other IDs are to be coupled or loaded. An ID type column 704 indicates the type of ID that is issued for the particular benefit plan. An issuing state column 706 and issuing country column 708 indicate the state and country that issued the other ID. The other IDs portion also includes an ID number column 710, an effective date column 712, and a through date column 714.

FIG. 8 includes other aspects of the benefit autoloader file 500, including a selection of other bill recipients, which may be optional for the creation of the multiple benefit plan files. A benefit plan ID column 802 includes benefit plan IDs (e.g., corresponding to one or more benefit plan IDs in column 508) into which the other bill recipients are to be coupled or loaded. A billing party column 804 indicates a party that may issue bills for a benefit plan, while a recipient ID column 806 indicates a party that will receive the bills for a benefit plan.

FIG. 9 includes other aspects of the benefit autoloader file 500, including a selection of riders, which may be optional for the creation of the multiple benefit plan files. A benefit plan ID column 902 includes benefit plan IDs (e.g., corresponding to one or more benefit plan IDs in column 508) which may be modified by the riders. A rider selection column 904 indicates which riders are to be applied for each individual benefit plan.

Figure 10:
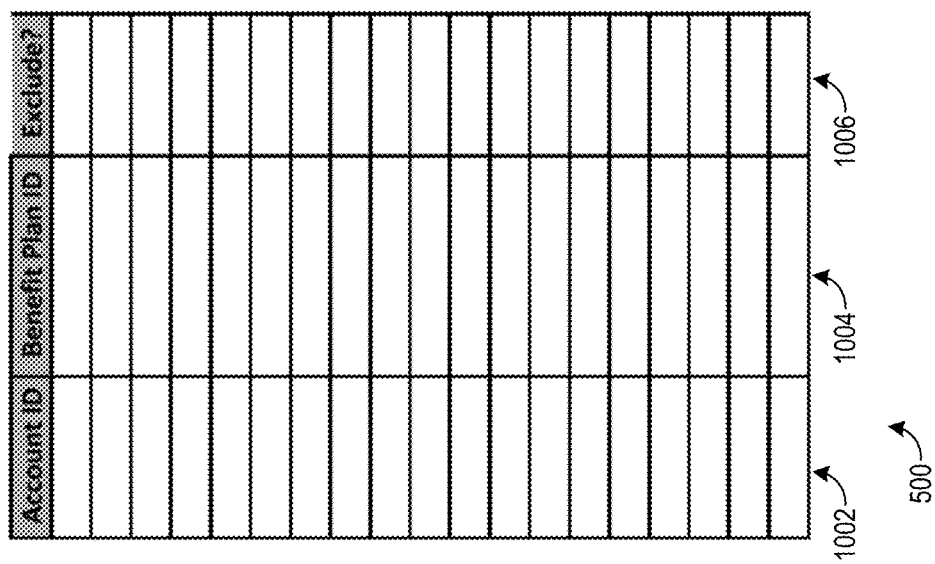
FIG. 10 illustrates a view of another portion of the Benefit Autoloader file shown in FIG. 5.

FIG. 10 includes other aspects of the benefit autoloader file 500, including a selection of benefit plans to exclude for particular accounts, which may be optional for the creation of the multiple benefit plan files. An account ID column 1002 includes account identifications (e.g., corresponding to one or more account IDs in account ID column 504). A benefit plan ID column 1004 includes benefit plan IDs (e.g., corresponding to one or more benefit plan IDs in column 508) which may be excluded for each account ID. Exclusion indicator column 1006 indicates whether the benefit plan ID in benefit plan ID column 1004 is excluded from the corresponding account ID in account ID column 1002.

A user completes, fills-in, or enters data into all or portions of the benefit autoloader file 500 and stores the completed benefit autoloader file 500 in the source database 112. The machine 100 can retrieve the completed benefit autoloader file 500 from the source database 112 as the structured records 116 shown in FIG. 1. Alternatively, a user can use a client device 244 to send or upload the completed benefit autoloader file 500 to the machine 100. Once the machine 100 has the completed benefit autoloader file 500, the machine 100 can begin creation of the multiple benefit plans in the form of unstructured records 118.

The machine 100 has access to or includes a field mapping file 111, which may be stored in mapping database 110. The field mapping file 111 includes the syntax and rules to generate unstructured syntax in unstructured records 118 from the structured records 116 (e.g., the benefit autoloader file 500 or input grid), benefit template files, or benefit rider files. The field mapping file 111 may be a single file or multiple files. The field mapping file 111 may exist as a java object, a spreadsheet, a properties file, or any other suitable file type that can be used to specify and control the generation of unstructured syntax from structured source files. The machine 100 may have access to many different field mapping files 111, and different field mapping files 111 may include unstructured syntax and rules specific to a particular target destination system (e.g., specific to HealthEdge). The machine 100 may use the field mapping files 111 to execute a syntax conversion to generate unstructured records including a pre-defined unstructured target output syntax that is specific to the particular target destination system. The field mapping files 111 may be pre-defined and may include mapping requirements specific to the unstructured target output syntax, which include a pre-configured field mapping between the structured records and the generated unstructured records. In another approach, the field mapping files 111 include syntax field mapping for syntax conversion, which further includes a target destination system specific process decomposition.

In one example, the field mapping file 111 includes all the unstructured syntax and rules to create unstructured record 118 in the form of Health Rules Language (HRL) files suitable for use with a HealthEdge target destination system 120. Examples of unstructured syntax and rules are included in the various tables and discussion below. Example applications of the unstructured syntax and rules to various source data files are described with respect to FIGS. 11-24.

Table 1 includes an example of unstructured syntax for a header section 1202 of a generated benefit plan file 1200 (see FIG. 12).

TABLE 1

Benefit plan
Name "<Benefit Plan Name>"
HCC plan id "<Benefit Plan ID>"
description "<Benefit Plan Description>"
purchased by "<Account ID>"
with anniversary date first renewal date <Renewal Date>
renewal interval in months <Plan Renewal Interval>
effective date <effective date>
plan year start date <Plan Start
    (Month/Day)> calculate benefits using
    base product [product from template
    HRL] benefit plan template "<benefit
    plan template>"

For Table 1, and the other tables below, text included within the angle brackets "<" and ">" operates as source indicators to instruct the machine 100 to pull the text for that particular portion from the benefit autoloader file 500. More particularly, the text within the angle brackets indicates the particular column of the benefit autoloader file 500 from which the machine 100 pulls the data for a particular benefit plan (e.g., row) within the benefit autoloader file 500. For example, with reference to FIG. 5, for the first line of text in Table 1 (Name "<Benefit Plan Name>"), the machine 100 will pull the filled-in benefit plan name included in the Benefit Plan Name column 506 for the particular row for which the machine 100 is generating a benefit plan file. If the machine 100 is generating the second benefit plan file (e.g., the second row), the machine 100 will pull the name "Man PPO 2" from the Benefit Plan Name column 506 and replace the angle brackets and the text within the angle brackets with the name pulled from the benefit autoloader file 500. Thus, in this particular example, the machine 100 will generate a line of unstructured syntax that reads as follows: Name "Man PPO 2". This is illustrated in FIG. 12 at the second line.

For Table 1, and the other tables below, text included within the square brackets "[" and "]" operate as source indicators to instruct the machine 100 to pull the text for that particular portion from the specified benefit template file. With reference to FIG. 5, the specified benefit template file is specified at the Benefit Plan Template column 502 for a particular benefit plan (e.g., row) within the benefit autoloader file 500. For example, for the second benefit plan file (e.g., the second row), the benefit autoloader file 500 indicates in the Benefit Plan Template column 502 that the machine 100 is to use the TLC PPO Plan template file (which template file is shown in FIG. 11). The machine 100 will then search the TLC PPO Plan template file for the indicated item within the square brackets. In this particular example, the machine 100 will find the text product "TLC PPO" within the TLC PPO Plan template file (see product indicator 1114 in FIG. 11), and will replace the square brackets and the text between the square brackets with the particular product indicated. Thus, in this particular example, the machine 100 will generate a portion of unstructured syntax that reads as follows: calculate benefits using base product "TLC PPO". This is illustrated in FIG. 12 at lines 11-12.

Various rules may be associated with the unstructured syntax indicated in Table 1 and the other tables below. The rules may be included as part of the logic of field mapping file 111. For example, the unstructured syntax in Table 1 and in each of the tables below may each be associated with a section name (e.g., Header, Benefit Plan Component, Value List, Network Definition, Riders, Other, or other section names). Additionally, the unstructured syntax in Table 1 and each of the tables below may be associated with a mandatory/conditional flag indicating that the unstructured syntax is mandatory for inclusion in the generated unstructured syntax file (e.g., the benefit plan file) or is conditional (e.g., is not mandatory but may be included if specified). Further, the unstructured syntax in Table 1 and each of the tables below may be associated with a placement order field that indicates the order in which the unstructured syntax included in the particular table is to be placed within the generated unstructured record (e.g., the generated benefit plan file). Additionally, the unstructured syntax in Table 1 and each of the tables below may be associated with a syntax complexity specifier which indicates a complexity of the syntax and associated rules used to generate the unstructured syntax lines for that particular portion of the generated unstructured record (e.g., benefit plan file).

In this particular example, for the unstructured syntax in Table 1, the section name is "Header", and the unstructured syntax is associated with a mandatory/conditional flag that indicates the unstructured syntax in Table 1 is mandatory. Further, the placement order field indicates that the unstructured syntax in Table 1 is to be ordered first within the generated benefit plan file, and the syntax complexity specifier indicates that the complexity for the section is low. Various rules may apply to the unstructured syntax in Table 1. For example, a rule specifies that if any of the following fields are not populated, the machine 100 stops processing the unstructured record and creates an exception report: Benefit Plan Name, HCC Plan ID, Account ID, Renewal Date, Plan Renewal Interval, Effective Date, Plan Start (Month/Day), or Benefit Plan Template. In an alternative embodiment, if the Renewal Date is missing, the machine 100 may calculate the next renewal date from the Plan Renewal Interval and the Effective Date. If the description field is not documented in the benefit autoloader file 500, the machine 100 will not create the unstructured syntax for that item. The machine 100 should generate the Renewal Date and the Effective Date in a MM/DD/YYYY format. The machine 100 should generate the Plan Year Start in a Month/DD (ex: January 01) format.

In one alternative, the unstructured syntax of Table 1 may also include reference to a situs state, which may be generated as follows: situs state <Situs State>. The situs state reference may be included after the plan year start date reference and before the base product reference. Various rules may be associated with the situs state unstructured syntax. For example, the situs state may be specific to the United States, and can be loaded using the state abbreviations (e.g., IL or NY) or the complete name spelled out (e.g., Illinois or New York).

FIG. 11 illustrates an example benefit template file 1100. FIGS. 12 and 13 together illustrate an example unstructured record including unstructured syntax that the machine 100 may generate. The generated unstructured record is in the form of a benefit plan file 1200, and may include text in a similar fashion as is shown in FIGS. 12 and 13. The machine 100 generates a header section 1202 according to the unstructured syntax included in Table 1 and the associated rules, both of which are included in the field mapping file 111. The machine 100 uses information included in the benefit autoloader file 500 and the benefit template file 1100 to complete indicated sections (e.g., text within angle brackets and square brackets) to generate the unstructured syntax of the header section 1202.

Table 2 includes an example of unstructured syntax for a Benefit Plan Component (BPC) section 1204 of a generated benefit plan file 1200.

TABLE 2 benefit definition
external definition
benefit plan component "[benefit plan
    component from template HRL]"
weight [weight from template HRL]
benefit plan template slot "[slot from
    template HRL]"

The unstructured syntax may be repeated for each BPC slot (e.g., BPC slot 1106) included in the benefit template file or in the benefit plan riders. In this particular example, for the unstructured syntax in Table 2, the section name is "Benefit Plan Component", and the unstructured syntax is associated with a mandatory/conditional flag that indicates the unstructured syntax in Table 2 is mandatory. Further, the placement order field indicates that the unstructured syntax in Table 2 is to be ordered second within the generated benefit plan file, and the syntax complexity specifier indicates that the complexity for the section is medium. Various rules may apply to the unstructured syntax in Table 2. For example, a rule specifies that the machine 100 pulls all items from the benefit template file. The machine 100 creates this unstructured syntax for every slot/weight/benefit plan component listed in the benefit template file. The machine 100 should stop creating this unstructured syntax when the template syntax references a slot including "value list" (illustrated at 1108 in FIG. 11). The benefit template file can include a slot without a BPC listed. However, if an action within a benefit rider file does not instruct the machine 100 to add a BPC to the blank slot, the machine 100 should delete the unstructured syntax associated with the empty slot. The machine 100 should place a comma between each BPC unstructured syntax portion, but the machine 100 should not place a comma after the final BPC unstructured syntax portion.

FIG. 11 shows a template BPC section 1104, which includes multiple individual BPC slots 1106. The machine 100 will create unstructured syntax as shown in Table 2 for each of the individual BPC slots 1106, unless otherwise modified by a benefit rider file (e.g., to add, remove, or overwrite a particular BPC slot 1106). As is shown spanning FIGS. 12 and 13, the machine 100 generates the BPC section 1204, which includes the unstructured syntax from Table 2 for each of the individual BPC slots 1106 from the benefit template file 1100. An individual example of the completed unstructured syntax for an individual BPC slot is shown at 1206 for the BPC slot "Exclusions" in the benefit template file 1100.

Table 3 includes an example of unstructured syntax for a Value List section 1208 of a benefit plan file 1200.

TABLE 3 values definition
external definition
value list "[value list from template HRL]"
benefit plan template slot "[slot from
    template HRL]"

In this particular example, for the unstructured syntax in Table 3, the section name is "Value List", and the unstructured syntax is associated with a mandatory/conditional flag that indicates the unstructured syntax in Table 3 is mandatory. Further, the placement order field indicates that the unstructured syntax in Table 3 is to be ordered third within the generated benefit plan file, and the syntax complexity specifier indicates that the complexity for the section is medium. Various rules may apply to the unstructured syntax in Table 3. For example, a rule specifies that the machine 100 pulls all items from the benefit template file. The machine 100 creates this unstructured syntax for every slot/value list included in the benefit template file. The machine 100 should stop creating this unstructured syntax when the template syntax references a network definition component, as is illustrated at 1110 in FIG. 11. If the benefit template file does not include a value list record, then the machine 100 will not create this unstructured syntax in the generated benefit plan file.

FIG. 11 shows a template Value List slot 1108, which includes a Value List. The machine 100 will create unstructured syntax as shown in Table 3 for the Value List slot 1108, unless otherwise modified by a benefit rider file. As is shown in FIG. 13, the machine 100 generates the Value List section 1208, which includes the unstructured syntax from Table 3 for each of the Value List slots 1108 (only one shown in FIG. 11) from the benefit template file 1100, and pulls in particular information from the Value List slot 1108 as dictated by the unstructured syntax (i.e., from Table 3) and associated rules within the field mapping file 111.

Table 4 includes an example of unstructured syntax for a Network Definition section 1210 of a generated benefit plan file.

TABLE 4 network definition
external definition
network definition component "[network
    definition component from template HRL]"

In this particular example, for the unstructured syntax in Table 4, the section name is "Network Definition", and the unstructured syntax is associated with a mandatory/conditional flag that indicates the unstructured syntax in Table 4 is mandatory. Further, the placement order field indicates that the unstructured syntax in Table 4 is to be ordered fourth within the generated benefit plan file, and the syntax complexity specifier indicates that the complexity for the section is medium. Various rules may apply to the unstructured syntax in Table 4. For example, a rule specifies that the machine 100 pulls the item from the benefit template file. The machine 100 creates no more than one network definition for a benefit plan file. If the benefit template file does not include a network definition record, then the machine 100 will not create this unstructured syntax in the generated benefit plan file.

FIG. 11 shows a template Network Definition 1110. The machine 100 will create unstructured syntax as shown in Table 4 for the template Network Definition 1110, unless otherwise modified by a benefit rider file. As is shown in FIG. 13, the machine 100 generates the Network Definition section 1210, which includes the unstructured syntax from Table 4 for the Network Definition 1110 from the benefit template file 1100, and pulls in particular information from the Network Definition 1110 as dictated by the unstructured syntax (i.e., from Table 4) and associated rules within the field mapping file 111.

Table 5 includes an example of unstructured syntax for an Other section 1212 of a benefit plan file 1200.

TABLE 5 funding amount based on [funding amount based
    on from template HRL]
valid coverage tiers "[coverage tier set]"

In this particular example, for the unstructured syntax in Table 5, the section name is "Other", and the unstructured syntax is associated with a mandatory/conditional flag that indicates the unstructured syntax in Table 5 is mandatory. Further, the placement order field indicates that the unstructured syntax in Table 5 is to be ordered fifth within the generated benefit plan file 1200 (however, it may be split into separate sections), and the syntax complexity specifier indicates that the complexity for the section is low. Various rules may apply to the unstructured syntax in Table 5. For example, a rule specifies that the machine 100 pulls the funding or coverage tier from the benefit template file 1100. The machine 100 creates no more than one of each of the funding or coverage tier.

In one alternative, the unstructured syntax of Table 2 may also include reference to a "funded as" indicator, which may be generated as follows: funded as <Funded As?>. The "funded as" indicator may be included before the "funding amount based on" language. Various rules may be associated with the "funded as" unstructured syntax. For example, the machine 100 will pull the "funded as" information from the benefit autoloader file 500, for example from the funded as column 528 shown in FIG. 5. If the benefit autoloader file 500 does not include "funded as" information, the machine 100 will not include the additional unstructured syntax.

FIG. 11 shows template Other portions 1112, including a funding and coverage tier indicators. The machine 100 will create unstructured syntax as shown in Table 5 for the template Other portions 1112, unless otherwise modified by a benefit rider file. As is shown in FIG. 13, the machine 100 generates the Other section 1212, which includes the unstructured syntax from Table 5 for the funding and coverage tier from the benefit template file 1100. The machine 100 also pulls in particular information from the Other portions 1112 as dictated by the unstructured syntax (i.e., from Table 5) and associated rules within the field mapping file 111.

Accordingly, the machine 100 may create a benefit plan file 1200 according to the unstructured syntax (see Tables 1-5 above) and associated rules contained within the field mapping file 111, while utilizing information from the benefit autoloader file 500 and the benefit template files 1100 to generate the unstructured syntax within the generated benefit plan file 1200. Tables 1-5 include unstructured syntax in accordance with one embodiment. However, if the benefit autoloader file 500 indicates that benefit rider files are to be utilized for creation of the benefit plan file, then alternative unstructured syntax and alternative rules may be utilized.

Table 6 includes an alternative example of unstructured syntax for a Benefit Plan Component (BPC) section of a generated benefit plan file.

TABLE 6 benefit definition
external definition
benefit plan component "[benefit plan
    component from template HRL]"
weight [weight from template HRL]
benefit plan template slot "[slot from
    template HRL]"
benefit plan rider "[available benefit plan
    riders from template HRL]"

The unstructured syntax of Table 6 may be used instead of the unstructured syntax of Table 2 (both of which are for the BPC section) for any individual BPC slot of the benefit template file that references or is altered by a benefit rider file. The unstructured syntax in Table 6 is associated with a mandatory/conditional flag that indicates the unstructured syntax in Table 6 is conditional (e.g., conditional upon a modification by a rider). The syntax complexity specifier indicates that the complexity for the section is high (e.g., complex). Various rules may apply to the unstructured syntax in Table 6 and may be included within the field mapping file 111. For example, a rule specifies that the machine 100 identifies any slot name listed in a benefit rider file that is also within the benefit template file. If the machine 100 does not find the slot name, then the machine 100 creates the benefit plan file without the change indicated in the benefit rider file and marks the file as an exception.

Dependent upon the action listed in the benefit rider file for a particular BPC element, the machine 100 will take one of the following actions:

a) REPLACE: remove the BPC name from the benefit plan file and replace it with the BPC name listed in the benefit rider file.
b) ADD: add the BPC name from the rider file to the BPC section (e.g., BPC section 1204 in FIGS. 12 and 13) in the benefit plan file.
c) REMOVE: remove the full syntax from the benefit plan file associated with the slot/record type indicated in the benefit rider file.
d) ADD OR REPLACE: if a BPC name is listed in the benefit template file, replace it with the BPC name included in the benefit rider file; if the BPC name is not listed in the benefit template file, add the BPC name from the benefit rider file to the benefit plan file.

For any syntax in the benefit template file that does not include a BPC name after all rider actions specified in one or more applicable benefit rider files have been executed, the machine 100 removes the syntax group with the missing BPC name from the generated benefit plan file.

An example of an ADD rider action is discussed within the context of the BPC section with reference to FIGS. 14-17. FIG. 14 shows another example benefit template file 1400. The benefit template file 1400 includes a template BPC section 1402. However, a particular slot within the template BPC section 1402 is a BPC rider slot 1404, which includes slot "Rider." FIG. 15 illustrates an example benefit rider file 1500 with name "Hearing Aids" that specifies an ADD action to add the BPC name "Hearing Aids, Medicare" into the slot with the name "Rider." Because of the reference to the Rider, the machine 100 will utilize the unstructured syntax of Table 6 (instead of Table 2) to generate the unstructured syntax of the particular BPC element. FIGS. 16 and 17 illustrate an example generated benefit plan file 1600, including the BPC section 1602. FIG. 17 shows the unstructured syntax for the BPC element 1702 that was generated by the machine 100 with reference to both the benefit template file 1400 as well as the benefit rider file 1500 according to the rules discussed above.

An example of a REMOVE rider action is discussed within the context of the BPC section with reference to FIGS. 18-21. FIG. 18 shows another example benefit template file 1800. The benefit template file 1800 includes a template BPC section 1802. A particular BPC slot 1804 ("Authorizations") is shown within the template BPC section 1802 within the benefit template file 1800. However, this particular BPC slot 1804 will be removed (e.g., not included within the generated benefit plan file, shown in FIGS. 20 and 21). FIG. 19 illustrates an example benefit rider file 1900 with name "Authorizations" that specifies a REMOVE action to remove the BPC slot "Authorizations." Because of the reference within the benefit rider file 1900 to the matching BPC slot 1804 within the benefit template file 1800, the machine 100 will utilize the rules associated with the unstructured syntax of Table 6 (instead of Table 2) to remove the BPC slot 1804 from inclusion in the generated benefit plan file 2000. FIGS. 20 and 21 illustrate an example benefit plan file 2000 generated by the machine 100. The example benefit plan file 2000 includes the BPC section 2002. However, as is shown at 2004, the BPC slot 1804 ("Authorizations") is not included within the generated benefit plan file 2000, despite the fact that it was present in the benefit template file 1800. This is due to the REMOVE action of the benefit rider file.

Table 7 includes an alternative example of unstructured syntax for a Value List section of a benefit plan file.

TABLE 7 values definition
external definition
value list "[value list from template HRL]"
benefit plan template slot "[slot from template HRL]"
benefit plan rider "[available benefit plan riders from template HRL]"

The unstructured syntax of Table 7 may be used instead of the unstructured syntax of Table 3 (both of which are for the Value List section) for any individual Value List slot of the benefit template file that references or is altered by a benefit rider file. The unstructured syntax in Table 7 is associated with a mandatory/conditional flag that indicates the unstructured syntax in Table 7 is conditional (e.g., conditional upon a modification by a rider). The syntax complexity specifier indicates that the complexity for the section is high (e.g., complex). The rules indicated above with reference to the unstructured syntax in Table 6 may apply in a similar logical manner to the unstructured syntax of Table 7 (but adding/removing/replacing Value List names instead of BPC names).

An example of a REPLACE rider action is discussed within the context of the Value List section with reference to FIGS. 11 and 22-24. FIG. 11 shows the example benefit template file 1100 including the template Value List slot 1108. The template Value List slot 1108 includes a reference to the value list "Over $200K Plan." FIG. 22 illustrates an example benefit rider file 2200 with name "Under 100K Plan" that specifies a REPLACE action to replace the Value List slot name "Over $200K Plan" with the value list name "Under 100K Plan." Because of the reference in the benefit rider file to the template Value List slot 1108, the machine 100 will utilize the unstructured syntax of Table 7 (instead of Table 3) to generate the unstructured syntax of the Value List section 2402. FIGS. 23 and 24 illustrate an example generated benefit plan file 2300. FIG. 24 shows the unstructured syntax for the Value List section 2402 that was generated by the machine 100 that references the "Under 100K Plan" from the benefit rider file 2200 instead of the "Over $200K Plan" originally included in the template Value List slot 1108. The machine 100 generates this unstructured syntax with reference to both the benefit template file 1100 as well as the benefit rider file 2200 according to the rules discussed above.

Table 8 includes an alternative example of unstructured syntax for a Network Definition section of a generated benefit plan file.

TABLE 8 network definition
external definition
network definition component "[network definition component from template HRL]"
benefit plan rider "[available benefit plan riders from template HRL]"

The unstructured syntax of Table 8 may be used instead of the unstructured syntax of Table 4 (both of which are for the Network Definition section) for any Network Definition of the benefit template file that references or is altered by a benefit rider file. The unstructured syntax in Table 8 is associated with a mandatory/conditional flag that indicates the unstructured syntax in Table 8 is conditional (e.g., conditional upon a modification by a rider). The syntax complexity specifier indicates that the complexity for the section is high (e.g., complex). The rules indicated above with reference to the unstructured syntax in Table 6 and Table 7 may apply in a similar logical manner to the unstructured syntax of Table 8 (but adding/removing/replacing Network Definitions instead of BPC names or Value Lists).

The unstructured syntax for other portions of a generated benefit plan file may be altered in much the same way as the unstructured syntax provided in Table 7 and Table 8 (e.g., including a reference to a rider that alters the particular portion). For example, a valid coverage tiers reference within the "Other" section 1212, as discussed above with respect to Table 5, may also include a rider reference having language as follows: rider for coverage tier set "[Rider name from Template HRL]".

Table 9 includes an example of optional unstructured syntax for a Riders section of a generated benefit plan file.

TABLE 9 chosen riders "<Rider Selection>","<Rider Selection>"

In this particular example, for the unstructured syntax in Table 9, the section name is "Riders", and the unstructured syntax is associated with a mandatory/conditional flag that indicates the unstructured syntax in Table 9 is conditional (e.g., conditional on any riders). Further, the placement order field indicates that the unstructured syntax in Table 9 is to be ordered sixth within the generated benefit plan file, and the syntax complexity specifier indicates that the complexity for the section is medium. Various rules may apply to the unstructured syntax in Table 9. For example, a rule specifies that the machine 100 pulls rider names from the benefit autoloader file 500 (e.g., from rider selection column 904 shown in FIG. 9). The rider name in the benefit autoloader file 500 should match exactly to the name in the benefit template file (save for capitalization). If the rider name is not in the benefit template file, the machine 100 will not perform any rider action and will create the benefit plan file without the rider information and mark the file as an exception. If the rider name in the benefit template file is not in the benefit autoloader file 500, the machine will not take any action with respect to the rider and will not mark the generated file as an exception. The riders section is optional. If no riders are chosen, the machine 100 will not generate the riders section syntax within the benefit plan file. The machine 100 will list out the rider names using a comma between them. The rider can contain more than action/slot scenarios and more than one action/slot scenario. The machine 100 may update the benefit plan file two times for each rider. The optional unstructured syntax of Table 9 and the associated rules may be included within the field mapping file 111.

FIGS. 17, 21, and 24 each illustrate a riders section 1704, 2102, and 2404, respectively. Each riders section includes the unstructured syntax from Table 9 and lists the particular rider associated with each generated benefit plan file. For example, riders section 1704 for benefit plan file 1600 lists the "Hearing Aides" rider (e.g., benefit rider file 1500), the riders section 2102 for benefit plan file 2000 lists the "Authorization" rider (e.g., benefit rider file 1900), and the riders section 2404 for benefit plan file 2300 lists the "Under 100K Plan" rider (e.g., benefit rider file 2200), each of which are discussed above. Further, the example listed riders correspond with the rider selection column 904 in FIG. 9.

Table 10 includes an example of optional unstructured syntax for an Open Enrollment Periods section of a generated benefit plan file.

TABLE 10 open enrollment periods
   <From Month>
   <From Day>
To
   <To Month>
   <To Day>
for medicare enrollment period "<Medicare Enrollment Period>"

In this particular example, for the unstructured syntax in Table 10, the section name is "Open Enrollment Period", and the unstructured syntax is associated with a mandatory/conditional flag that indicates the unstructured syntax in Table 10 is conditional (e.g., conditional on inclusion of user defined open enrollment periods in the benefit autoloader file 500). Further, the placement order field indicates that the unstructured syntax in Table 10 is to be ordered seventh within the generated benefit plan file, and the syntax complexity specifier indicates that the complexity for the section is low. Various rules may apply to the unstructured syntax in Table 10. For example, a rule specifies that the machine 100 will pull the From Month, From Day, To Month, To Day, and Medicare Enrollment Period data from the benefit autoloader file 500. These values are included at columns 530-538 in FIG. 5. If values From Month/From Day/To Month/To Day values are not provided in the benefit autoloader file 500, the machine will not generate this syntax. The Medicare Enrollment Period does not have to be populated, and the machine 100 will not generate the Medicare Enrollment Period syntax without the From Month/From Day/To Month/To Day syntax. The optional unstructured syntax of Table 10 and the associated rules may be included within the field mapping file 111. FIG. 13 illustrates an example of an open enrollment periods section 1214 including the unstructured syntax of Table 10.

Table 11 includes an example of optional unstructured syntax for a Wrap Around Benefit section of a generated benefit plan file.

TABLE 11 wrapped by
benefit plan "[wrap around benefit plan]"
benefit plan template slot "[slot from template HRL]"

In this particular example, for the unstructured syntax in Table 11, the section name is "Wrap Around Benefit", and the unstructured syntax is associated with a mandatory/conditional flag that indicates the unstructured syntax in Table 11 is conditional (e.g., conditional on any Wrap Around benefit plans). Further, the placement order field indicates that the unstructured syntax in Table 11 is to be ordered eighth within the generated benefit plan file, and the syntax complexity specifier indicates that the complexity for the section is low. Various rules may apply to the unstructured syntax in Table 11. For example, a rule specifies that the machine 100 pulls all items from the benefit template file. The machine 100 generates the unstructured syntax of Table 11 for every slot/wrap around benefit plan listed in the benefit template file. The machine 100 stops creating the Wrap Around Benefit syntax when the benefit template file syntax references available benefit plan riders (e.g., available benefit plan rider 1116 in FIG. 11). If the machine 100 does not find a wrap around benefit plan record in the benefit template file, the machine 100 will not generate the unstructured syntax of Table 11.

In an alternative, the wrap around benefit plan may be indicated in a benefit rider file. Thus, in a similar manner as is discussed above, the machine 100 may alter benefit template file slots according to actions (e.g., ADD, REMOVE, or REPLACE) specified within benefit rider files. If a benefit rider file modifies the wrap around benefit, then the unstructured syntax of Table 11 may also include the following language at the end: benefit plan rider "[available benefit plan riders from template HRL]". The optional unstructured syntax of Table 11 and the associated rules may be included within the field mapping file 111.

Table 12 includes an example of optional unstructured syntax for a High Deductible Health Plan (HDHP) section of a generated benefit plan file.

TABLE 12 this is a qualified high deductible plan

In this particular example, for the unstructured syntax in Table 12, the section name is "HDHP", and the unstructured syntax is associated with a mandatory/conditional flag that indicates the unstructured syntax in Table 12 is conditional (e.g., conditional on selection of HDHP in the benefit autoloader file 500). Further, the placement order field indicates that the unstructured syntax in Table 12 is to be ordered ninth within the generated benefit plan file, and the syntax complexity specifier indicates that the complexity for the section is low. Various rules may apply to the unstructured syntax in Table 12. For example, a rule specifies that the machine 100 will create the syntax only when the HDHP column 526 (see FIG. 5) is marked yes. If the HDHP column 526 is marked no or left blank, the machine 100 will not create the syntax. The optional unstructured syntax of Table 12 and the associated rules may be included within the field mapping file 111.

Table 13 includes an example of optional unstructured syntax for a User Defined Terms (UDT) section of a generated benefit plan file.

TABLE 13 this benefit plan user defined terms
user defined term "<User Defined Term>"
"<Attribute Name>"
"<Attribute Field Value>"

In this particular example, for the unstructured syntax in Table 13, the section name is "UDT", and the unstructured syntax is associated with a mandatory/conditional flag that indicates the unstructured syntax in Table 13 is conditional (e.g., conditional on inclusion of user defined terms in the benefit autoloader file 500). Further, the placement order field indicates that the unstructured syntax in Table 13 is to be ordered tenth within the generated benefit plan file, and the syntax complexity specifier indicates that the complexity for the section is low. Various rules may apply to the unstructured syntax in Table 13. For example, a rule specifies that the machine 100 will create the syntax only when the user defined term column 604, the attribute name column 606, and the attribute field value column 608 (see FIG. 6) are all populated for a given row. If any of those three columns are blank, then the machine 100 will not generate the unstructured syntax and will mark the generated benefit plan file as an exception. If more than one UDT record is listed in the benefit autoloader file 500, then the machine will place a comma between each generated syntax, but will not include a comma after the last UDT syntax. The optional unstructured syntax of Table 13 and the associated rules may be included within the field mapping file 111.

Table 14 includes an example of optional unstructured syntax for an Other IDs section of a generated benefit plan file.

TABLE 14 other Ids
identification number
type "<ID Type>"
id "<ID Number>"
issuing state "<Issuing State/Province>"
issuing country <Issuing Country>
effective start date <effective date>
effective end date <effective end date>

In this particular example, for the unstructured syntax in Table 14, the section name is "Other IDs", and the unstructured syntax is associated with a mandatory/conditional flag that indicates the unstructured syntax in Table 14 is conditional (e.g., conditional on inclusion of other IDs in the benefit autoloader file 500, for example, at columns 704-714 shown in FIG. 7). Further, the placement order field indicates that the unstructured syntax in Table 14 is to be ordered eleventh within the generated benefit plan file, and the syntax complexity specifier indicates that the complexity for the section is low. Various rules may apply to the unstructured syntax in Table 14. For example, a rule specifies that the machine 100 generates the syntax only when Other ID information is provided in the benefit autoloader file 500 (e.g., at columns 704-714). The machine 100 will pull all data elements will be pulled from the benefit autoloader file 500. The ID Type and ID Number fields are required to create the unstructured syntax of Table 14. However, if the Issuing State, Issuing Country, Effective Start Date, or the Effective End Date are not completed within the benefit autoloader file 500, the machine 100 will not create the particular line of syntax associated with the missing items. If more than one Other ID is listed, the machine 100 will place a comma between the Other IDs, but the machine 100 will not place a comma after the last Other ID. The optional unstructured syntax of Table 14 and the associated rules may be included within the field mapping file 111. FIG. 13 illustrates an example of an Other IDs section 1216 including the unstructured syntax of Table 14.

Table 15 includes an example of optional unstructured syntax for an Other Bill Recipients section of a generated benefit plan file.

TABLE 15

Other bill recipients
recipient "[Recipient ID from template HRL]"
billing party [Billing Party from template HRL]
OR
Other bill recipients
recipient "<Recipient ID>"
billing party <Billing Party>

In this particular example, for the unstructured syntax in Table 15, the section name is "Other Bill Recipients", and the unstructured syntax is associated with a mandatory/conditional flag that indicates the unstructured syntax in Table 15 is conditional (e.g., conditional on inclusion of other bill recipients in the benefit autoloader file 500, for example, at columns 804 and 806 shown in FIG. 8). Further, the placement order field indicates that the unstructured syntax in Table 15 is to be ordered thirteenth within the generated benefit plan file, and the syntax complexity specifier indicates that the complexity for the section is low. Various rules may apply to the unstructured syntax in Table 15. For example, a rule specifies that the machine 100 will generate the syntax from either the benefit template file or the benefit autoloader file 500. The machine 100 generates the syntax from data included within the benefit template file or within the benefit autoloader file 500, but will prioritize data from the benefit autoloader file 500 in data is present in both. If no Other Bill Recipient information is included in the benefit template file or the benefit autoloader file, the machine 100 will not create the syntax. The optional unstructured syntax of Table 14 and the associated rules may be included within the field mapping file 111. FIG. 13 illustrates an example of an Other Bill Recipients section 1218 including the unstructured syntax of Table 15.

So configured, the machine 100, and in particular, the data conversion circuitry 104, can generate unstructured syntax within unstructured records 118. The machine 100 can generate the unstructured records from structured records 116 including structured or normalized data. Various embodiments above are discussed with reference to the particular unstructured syntax requirements of a specific example target destination system (i.e., Health Edge), it should be understood that the teachings disclosed herein can be expanded to cover many application settings where unstructured syntax is generated from structured records according to a field mapping. The same machine 100 may generate many different unstructured syntax formats by swapping out the particular field mapping file 111 that is used for a particular target destination system. Further, a field mapping file 111 can be easily updated to comply with any changes (e.g., language or code changes) that may be implemented by the target destination system.

The machine 100, and in particular, the validation circuitry 108, may perform a validation on the unstructured records generated by the data conversion circuitry 104. For example, within the HealthEdge context, the validation circuitry 108 may perform a series of validation checks as listed in Table 16, below.

TABLE 16

| VALIDATION CHECK | ADDITIONAL INFORMATION | ACTION |
| --- | --- | --- |
| Validate <benefit plan template> is not blank. | | If blank, generate error message "Benefit Plan Template name not provided." and stop. |
| Validate <benefit plan template> has a matching benefit template file. | | If record not found, create error message "Missing template HRL file for <benefit plan template>" and stop. |
| Validate <benefit plan name> is not blank. | | If record not found, create error message "Benefit Plan Name not provided" and stop. |
| Validate <benefit plan ID> is not blank. | | If record not found, create error message "Benefit Plan ID not provided" and stop. |
| Validate <account ID> is not blank. | | If record not found, create error message "Account ID not provided" and stop. |
| Validate <Renewal Date> is not blank. | | If record not found, create error message "Renewal Date not provided" and stop. |
| Validate <Plan Renewal Interval> is not blank. | | If record not found, create error message "Plan Renewal Interval not provided" and stop. |
| Validate <Effective Date> is not blank. | | If record not found, create error message "Effective Date not provided" and stop. |
| Validate <Plan Start (month/day)> is not blank. | | If record not found, create error message "Plan start date not provided" and stop. |
| If Open Enrollment Period exists, validate the following data elements <from month>, <from day>, <to month>, <to day> are not blank. | All fields listed are required. | If fields are blank, create an error message "Required data element for Open Enrollment Period was not provided". Proceed without syntax for open enrollment period. |
| If UDT exists, validate the following data elements <User Defined Term>, <Attribute Name>, <Attribute> are not blank. | All fields listed are required. | If fields are blank, create an error message "Required data element for UDT was not provided". Proceed without syntax for UDT. |
| If <Other IDs (Optional)> is exists, validate the following data elements <ID Type>, <ID Number> are not blank. | All fields listed are required. | If fields are blank, create an error message "Required data element for Other IDs was not provided". Proceed without syntax for Other ID. |

TABLE 16-continued

| VALIDATION CHECK | ADDITIONAL INFORMATION | ACTION |
| --- | --- | --- |
| If <Rider Selection>exists, identify a matching Rider HRL File. | | If no match, create error message "Rider record <Rider Selection> not found". Proceed without rider action. |
| If <Rider Selection> exists, validate [slot from benefit template file] = [slot from rider]. | | If no match, create error message "Rider slot not found in template". Proceed without rider action. |
| If <Rider Selection> exists, validate that any slots with an "ADD" only function, have a matching slot without a component listed. | Only for Value list and benefit plan component. Only for the Add function. Does not apply to Add or Replace function. | If the matching slot has a component, create an error "Rider requested to "ADD" and [slot from template HRL] is not blank. |
| If two or more matching template files are identified, identify the benefit template file that has the newest date that is prior to the <effective date>. | | Create message "Used Template HRL [HRL template file name]" |
| If two or more matching rider files are identified, identify the Rider HRL file that has the newest date that is prior to the <effective date>. | | Create message "Used Rider HRL [HRL Rider file name]" |

FIG. 25 illustrates an example validation report 2500 that is generated by the validation circuitry according to the validation checks listed in Table 16.

Figure 26:
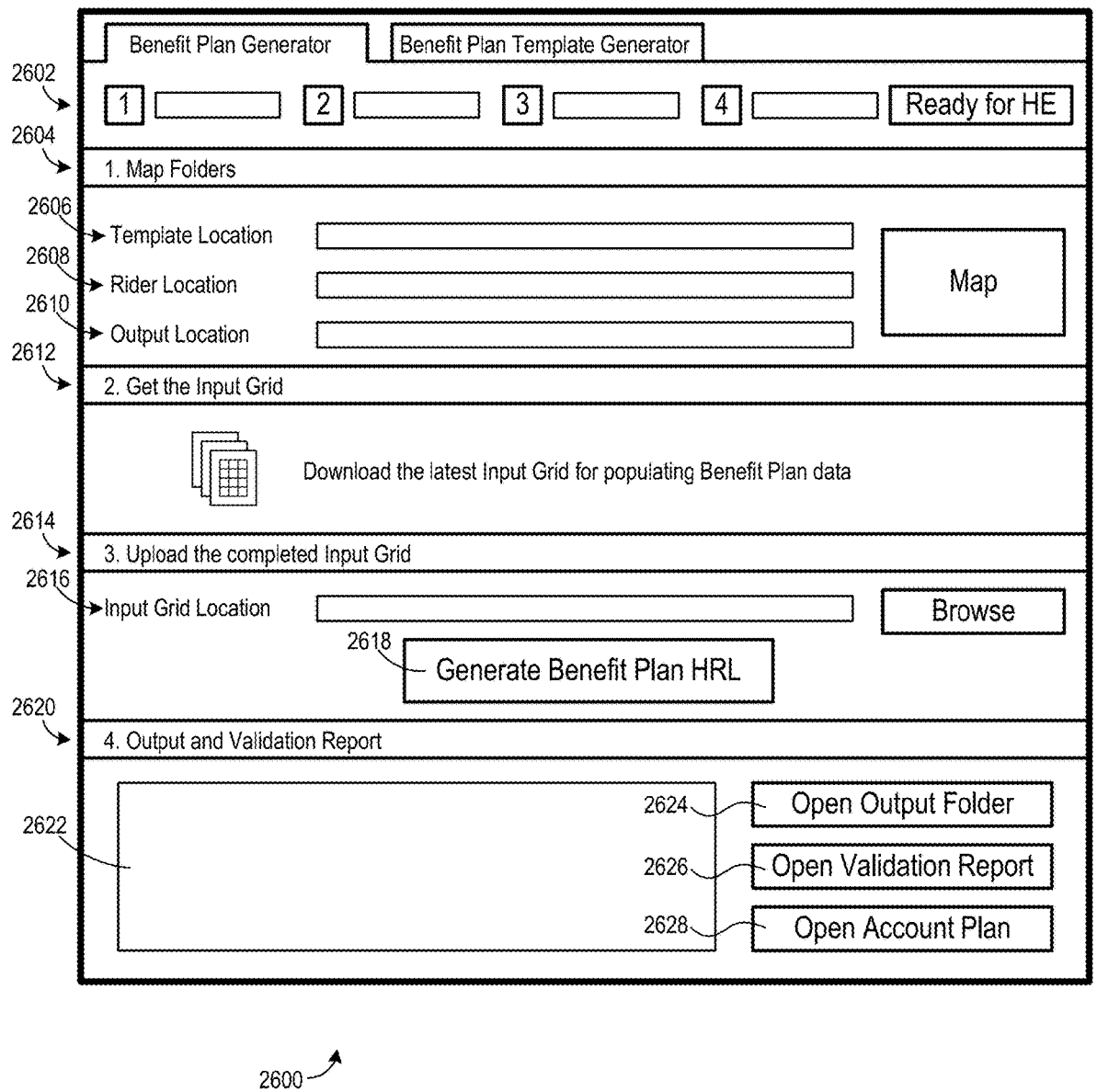
FIG. 26 illustrates an example graphical user interface (GUI).

FIG. 26 illustrates an example graphical user interface (GUI) that may be provided to a user to implement autoloading and generation of multiple benefit plan files (e.g., unstructured records) for submission to a target destination system. The GUI 2600 may be provided by the user interface circuitry 106. The memory 206 may store the GUI 2600 as GUI instructions and data 230 (see FIG. 2). The GUI 2600 may include a status indicator 2602 to provide feedback to the user as to their progress through the steps to generate the multiple benefit plan files. The GUI 2600 also includes a folder mapping section 2604 where a user can select a template location 2606, a rider location 2608, and an output location 2610. The GUI 2600 also includes an Input Grid download section 2612, where a user can download the latest Input Grid (e.g., benefit autoloader file 500). The GUI 2600 also includes a completed Input Grid upload section 2614 where, after the user completes the Input Grid, the user can select the input grid location 2616 for uploading the completed input grid. The user can then select a generate benefit plan button 2618. The GUI 2600 also includes an output and validation section 2620 including a viewing window 2622 that provides information and feedback to the user. The user can also select various selectors to open an output folder 2624, open a validation report 2626 (e.g., as shown in FIG. 25), or open an account plan 2628.

Upon generation and validation of the unstructured records including the unstructured syntax (e.g., benefit plan files), the machine 100 may upload the generated files to a destination database 114 of a target destination system 120. In one approach, the machine 100 uploads the generated unstructured records to a File Transfer Protocol (FTP) storage location. The machine 100 can send a message to the target destination system 120 to inform the target destination system 120 that new unstructured records are uploaded and are ready for implementation on the target destination system 120.

The methods, devices, processing, circuitry, structures, architectures, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings. In one example, a computer-readable medium includes instructions that, when executed by a processor, causes the processor to perform various method steps as discussed elsewhere within this disclosure.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations have been specifically described. However, many other implementations are also possible.

What is claimed is:

1. A machine comprising:
a communication interface in communication with a source database and a destination database, the communication interface configured to retrieve structured records from the source database, the structured records comprising data in a predefined table or a row and column structure; and
obtain mapping requirements from a pre-configured field mapping between the structured records and unstructured records, the mapping requirements being specific to a pre-defined unstructured target output syntax of the unstructured records and the preconfigured field mapping comprising a source indicator,
execute a syntax conversion to decompose the structured records and generate the unstructured records to include the data included in the structured records and additional data, the unstructured records complying with the pre-defined unstructured target output syntax and the additional data from a source of the additional data indicated by the source indicator,
execute an unstructured validation on the unstructured records to verify compliance of the unstructured records with the unstructured target output syntax, and
deliver the unstructured records to the destination database through the communication interface.

2. The machine of claim 1, where the field mapping specifies control and generation of unstructured syntax from the structured records.

3. The machine of claim 1, wherein the unstructured records are generated in accordance with the pre-configured field mapping.

4. The machine of claim 1, where:
the pre-configured field mapping comprises a target destination system specific process decomposition.

5. The machine of claim 4, where the data conversion circuitry is further configured to:
include, as part of the unstructured records, unstructured syntax included as part of the pre-configured field mapping.

6. The machine of claim 5, where the data conversion circuitry is further configured to:
include, as part of the unstructured records, additional data within the unstructured syntax, a source of the additional data indicated by a source indicator of the pre-configured field mapping.

7. The machine of claim 1, where:
the data conversion circuitry is further configured to generate a graphical user interface including: a source database selector, a destination database selector, a template selector, a rider selector, or any combination thereof.

8. The machine of claim 1, where the unstructured records include at least some of the data in a natural language format.

9. The machine of claim 1, where the unstructured records comprise data in strings, lines, paragraphs or combinations thereof in a file format compatible with data input requirements of a target destination system that accesses the destination database.

10. A method comprising:
retrieving, by a communication interface, structured records from a source database, the structured records comprising data;
receiving, by data conversion circuitry, the structured records;
obtaining, by the data conversion circuitry, mapping requirements specific to a pre-defined unstructured target output syntax for the data from a pre-configured field mapping between the structured records and unstructured records;
executing, by the data conversion circuitry, a syntax conversion of the data included in the structured records to generate the unstructured records to include the data, the unstructured records complying with the pre-defined unstructured target output syntax;
including, as part of the unstructured records, unstructured syntax of the data, the unstructured syntax included as part of the pre-configured field mapping;
including, as part of the unstructured records, additional data within the unstructured syntax, a source of the additional data indicated by a source indicator of the pre-configured field mapping; and
delivering, by the data conversion circuitry, the unstructured records to a destination database through the communication interface.

11. The method of claim 10 where:
a syntax of the pre-configured field mapping comprises a target destination system specific process decomposition.

12. The method of claim 10 further comprising:
pulling the additional data from the structured records based on the source indicator indicating that the additional data is to be pulled from the structured records.

13. The method of claim 10 further comprising:
executing, by the data conversion circuitry, an unstructured validation on the unstructured records to verify compliance of the unstructured records with the unstructured target output syntax.

14. The method of claim 10 further comprising:
generating, by the data conversion circuitry, a graphical user interface including: a source database selector, a destination database selector, a template selector, a rider selector, or any combination thereof.

15. A machine comprising:

a communication interface; and data conversion circuitry configured to:

receive structured records from a source database via the communication interface, the structured records comprising data in a table or row and column structure, obtain mapping requirements specific to a pre-defined unstructured target output syntax from a pre-configured field mapping between the structured records and unstructured records of a target destination system, the field mapping specifying control and generation of unstructured syntax from the structured records and including a source indicator indicative of a source of additional data, execute a syntax conversion on the structured records to generate the unstructured records in accordance with the pre-configured field mapping to include the additional data within the unstructured syntax from the source of additional data indicated by the source indicator, the unstructured records generated to comply with the pre-defined unstructured target output syntax, the unstructured records comprising strings, lines, paragraphs or combinations thereof in a file format compatible with the target destination system, and deliver the unstructured records to a destination database of the target destination system via the communication interface.

16. The machine of claim 15, where the data conversion circuitry is further configured to execute an unstructured validation on the unstructured records to verify compliance of the data included in the unstructured records with the unstructured target output syntax stored within the unstructured records.

17. The machine of claim 15, where the data conversion circuitry is further configured to select and retrieve one of a plurality of field mapping files from a mapping database, the one of the plurality of field mapping files being specific to the target destination system.

18. The machine of claim 17, where the one of the plurality of field mapping files includes a syntax and rules executable by the data conversion circuitry to specify and control generation of unstructured syntax of the data in the structured records.

19. The machine of claim 18, where the syntax and rules are executable by the data conversion circuitry to perform syntax conversion of the data in the structured records.

20. The machine of claim 15, wherein each of the unstructured records comprises a datafile compatible with the target destination system that includes the data from a corresponding one of the structured records in a format and syntax useable by the target destination system.

* * * * *